US008300785B2

(12) United States Patent
White

(10) Patent No.: US 8,300,785 B2
(45) Date of Patent: *Oct. 30, 2012

(54) REFLECTED BACKDROP FOR COMMUNICATIONS SYSTEMS

(75) Inventor: Peter McDuffie White, McKinney, TX (US)

(73) Assignee: TelePresence Technologies, LLC, Plano, TX (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/814,191

(22) Filed: Jun. 11, 2010

(65) Prior Publication Data

US 2010/0253761 A1 Oct. 7, 2010

Related U.S. Application Data

(60) Division of application No. 11/085,292, filed on Mar. 21, 2005, now Pat. No. 7,760,229, which is a continuation-in-part of application No. 10/897,453, filed on Jul. 23, 2004, now Pat. No. 7,057,637.

(60) Provisional application No. 60/564,098, filed on Apr. 21, 2004.

(51) Int. Cl.
*H04M 11/00* (2006.01)

(52) U.S. Cl. ................................. 379/93.21; 348/14.01

(58) Field of Classification Search ............... 348/14.01, 348/14.07, 14.08, 14.09, 14.16, 14.12, 14.13; 379/88.13, 93.12, 158, 202.01, 205.01, 93.21
See application file for complete search history.

(56) References Cited

U.S. PATENT DOCUMENTS

| | | | |
|---|---|---|---|
| 2,420,198 A | 6/1944 | Rosenthal |
| 4,022,461 A | 5/1977 | Harris |
| 4,232,939 A | 11/1980 | Kikuchi |
| 4,298,246 A | 11/1981 | Iwamura |
| 4,309,073 A | 1/1982 | Nishimura et al. |
| 4,558,922 A | 12/1985 | Smith |
| 4,732,441 A | 3/1988 | Cheng |

(Continued)

FOREIGN PATENT DOCUMENTS

GB 2 353 429 A 2/2001

(Continued)

OTHER PUBLICATIONS

Communication pursuant to Article 94(3) EPC, Applicant: Peter McDuffie White, Jun. 21, 2010, 6 pages.

(Continued)

*Primary Examiner* — Olisa Anwah
(74) *Attorney, Agent, or Firm* — Slater & Matsil, L.L.P.

(57) ABSTRACT

A video conferencing system has a two-way mirror, which is between the observer and the display device, positioned at an angle to reflect a backdrop surface. The backdrop surface, which is further away from the two-way mirror than the image plane of the image display device, appears superimposed in a position behind the image of a person from the remote location. A camera is located in the backdrop at a position along the line of sight of the transmitted image so that a perceived eye contact is achieved. A system is disclosed wherein telepresence systems that are compatible with a pre-defined standard are connected via a network connecting, either directly or via a telepresence operations center, to provide interaction with substantially life-sized images of the remote participant displayed with three-dimensional depth cues in the room setting.

17 Claims, 21 Drawing Sheets

U.S. PATENT DOCUMENTS

| | | |
|---|---|---|
| 4,738,522 A | 4/1988 | Lunde et al. |
| 4,738,526 A | 4/1988 | Larish |
| 4,805,895 A | 2/1989 | Rogers |
| 4,821,307 A | 4/1989 | Flint |
| 4,965,819 A | 10/1990 | Kannes |
| 5,061,061 A | 10/1991 | Robley et al. |
| 5,117,285 A | 5/1992 | Nelson et al. |
| 5,194,955 A | 3/1993 | Yoneta et al. |
| 5,221,937 A | 6/1993 | Machtig |
| 5,255,028 A | 10/1993 | Biles |
| 5,278,596 A | 1/1994 | Machtig |
| 5,365,354 A | 11/1994 | Jannson et al. |
| 5,400,069 A | 3/1995 | Braun et al. |
| 5,438,357 A | 8/1995 | McNelley |
| 5,473,469 A | 12/1995 | Magocs et al. |
| 5,526,425 A | 6/1996 | Meyer et al. |
| 5,528,425 A | 6/1996 | Beaver |
| 5,532,736 A | 7/1996 | Kuriki et al. |
| 5,541,769 A | 7/1996 | Ansley et al. |
| 5,550,754 A | 8/1996 | McNelley et al. |
| 5,573,325 A | 11/1996 | Lekowski |
| 5,609,939 A | 3/1997 | Petersen et al. |
| 5,619,254 A | 4/1997 | McNelley |
| 5,639,151 A | 6/1997 | McNelley et al. |
| 5,685,625 A | 11/1997 | Beaver |
| 5,689,553 A * | 11/1997 | Ahuja et al. ............. 379/202.01 |
| 5,777,665 A | 7/1998 | McNelley et al. |
| 5,782,547 A | 7/1998 | Machtig et al. |
| 5,837,346 A | 11/1998 | Lanqille et al. |
| 5,865,519 A | 2/1999 | Maass |
| 5,890,787 A | 4/1999 | McNelley et al. |
| 5,892,538 A | 4/1999 | Gibas |
| 5,923,469 A | 7/1999 | Machtig et al. |
| 5,953,052 A | 9/1999 | McNelley et al. |
| 5,963,246 A | 10/1999 | Kato |
| 6,023,369 A | 2/2000 | Goto |
| 6,042,233 A | 3/2000 | Mihashi et al. |
| 6,042,235 A | 3/2000 | Machtig et al. |
| 6,044,226 A | 3/2000 | McWilliams |
| 6,086,380 A | 7/2000 | Chu et al. |
| 6,104,424 A | 8/2000 | McNelley |
| 6,243,130 B1 | 6/2001 | McNelley et al. |
| 6,290,359 B1 | 9/2001 | Shriver |
| 6,323,892 B1 | 11/2001 | Mihara |
| 6,351,762 B1 | 2/2002 | Ludwig et al. |
| 6,421,174 B1 | 7/2002 | Ooshima et al. |
| 6,600,600 B2 | 7/2003 | Chen |
| 6,704,294 B1 | 3/2004 | Cruickshank |
| 6,710,797 B1 | 3/2004 | McNelley et al. |
| 7,057,637 B2 | 6/2006 | White |
| 2003/0104806 A1* | 6/2003 | Ruef et al. ................... 455/422 |
| 2004/0179714 A1* | 9/2004 | Jouppi .......................... 382/103 |
| 2004/0181801 A1 | 9/2004 | Hagen et al. |
| 2004/0207724 A1 | 10/2004 | Crouch et al. |
| 2005/0007445 A1* | 1/2005 | Foote et al. ................. 348/14.08 |
| 2005/0099605 A1 | 5/2005 | Buchner |
| 2005/0216252 A1* | 9/2005 | Schoenbach et al. ............. 704/3 |
| 2005/0237382 A1 | 10/2005 | White |
| 2005/0251421 A1* | 11/2005 | Chang et al. ..................... 705/2 |
| 2008/0012936 A1 | 1/2008 | White |

FOREIGN PATENT DOCUMENTS

| | | |
|---|---|---|
| KR | 2002-0074274 | 9/2002 |
| WO | WO 94/30016 | 12/1994 |
| WO | WO 96/09722 | 3/1996 |
| WO | WO 01/11880 A1 | 2/2001 |

OTHER PUBLICATIONS

Chinese Office Action, Application No. 200780041208.6, Aug. 4, 2010, pp. 1-4.

English Translation of Chinese Office Action, Application No. 200780041208.6, Aug. 4, 2010, 7 pages.

Wellens, R., "A device that provides an eye-to-eye video perspective for interactive television," Behavior Research Methods & Instruments, vol. 10, No. 1, 1978, pp. 25-26.

"Eye-to-Eye Contact for Desk-to-Desk Video Conferencing," IBM Technical Disclosure Bulletin, vol. 35, No. 2, Jul. 1992, pp. 316-318.

Komatsu, T., et al., "41.2: Multiscreen Display Method for Expanding Stereoscopic Viewing Space," SID International Symposium—Digest of Technical Papers, US, Playa Del Rey, SID, vol. 24, May 16, 1993, pp. 905-908.

De Silva, LC. et al., "A Multiple Person Eye Contact (MPEC) Teleconferencing System," Proceedings of the International Conference on Image Processing (ICIP), US, Los Alamitos, IEEE Comp. Soc. Press, Oct. 23, 1995, pp. 607-610.

International Search Report, Application No. PCT/US05/09440, Sep. 10, 2007, 8 pages.

Extended European Search Report, Application No. 07843007.1-2223, Applicant: Peter McDuffie White, Dec. 14, 2010, 5 pages.

* cited by examiner

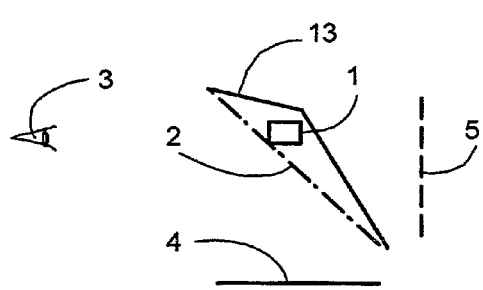
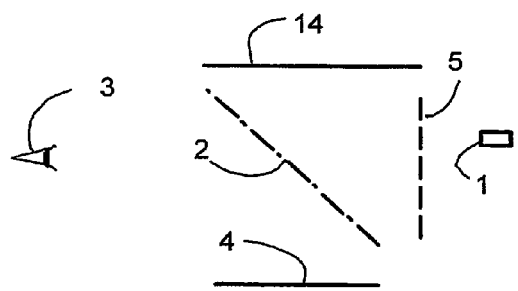
Fig. 1
PRIOR ART
Fig. 2
PRIOR ART
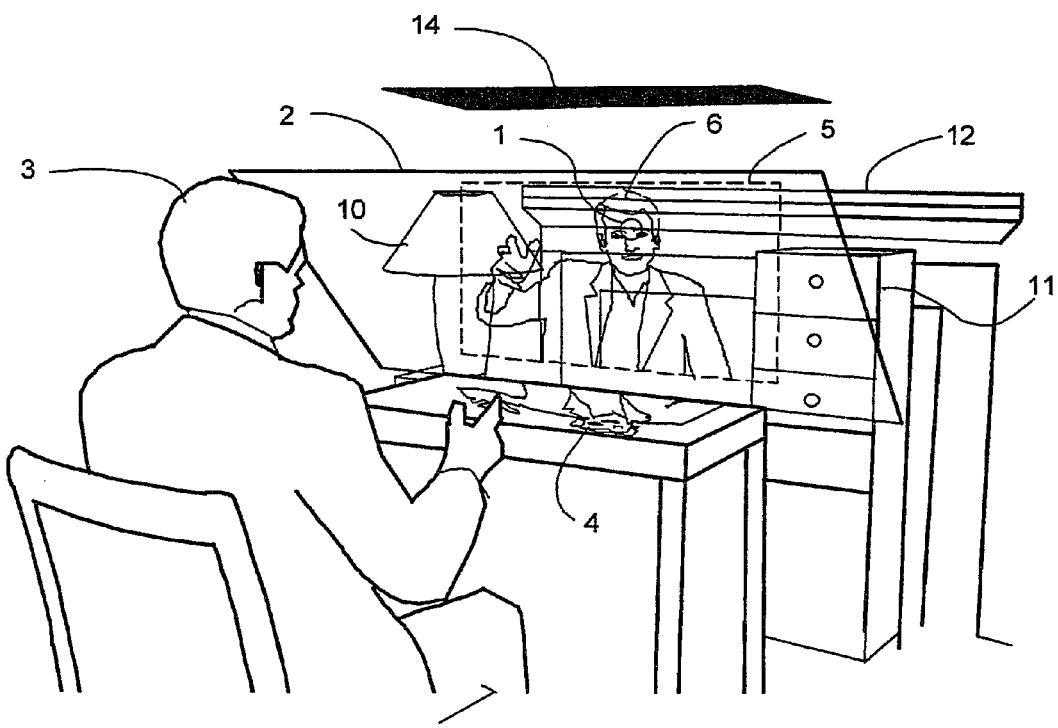
Fig. 3
PRIOR ART

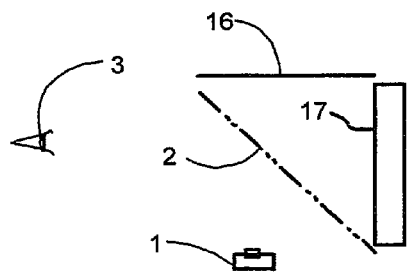
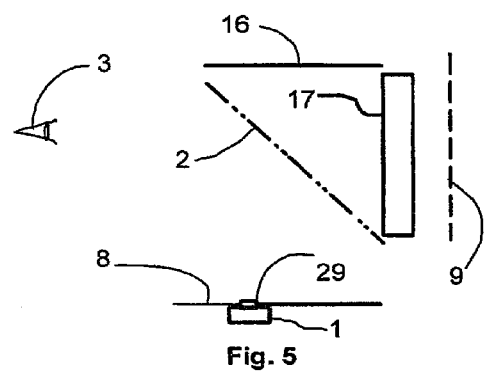
Fig. 4
PRIOR ART
Fig. 5
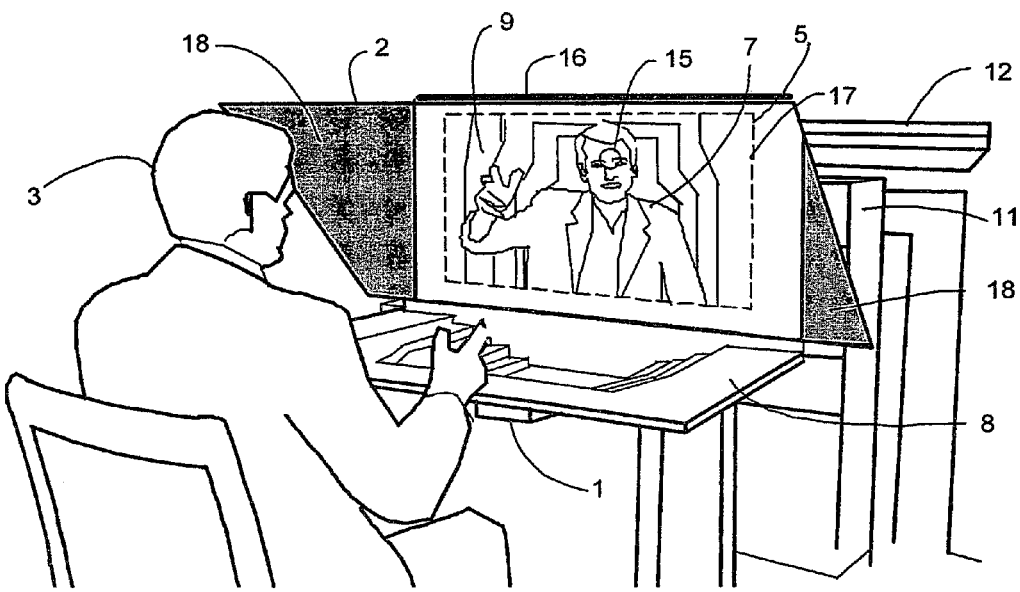
Fig. 6

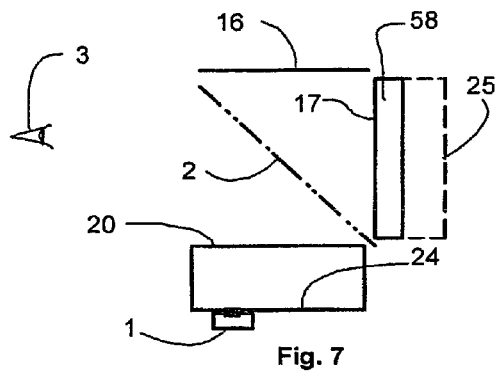
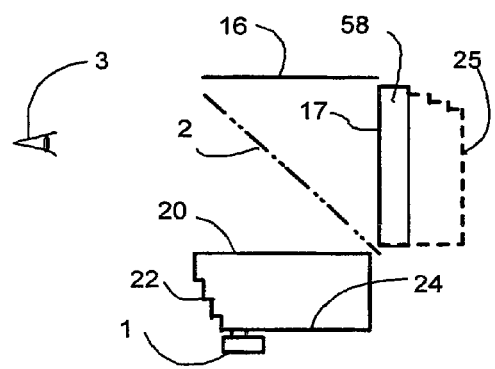
Fig. 7
Fig. 8
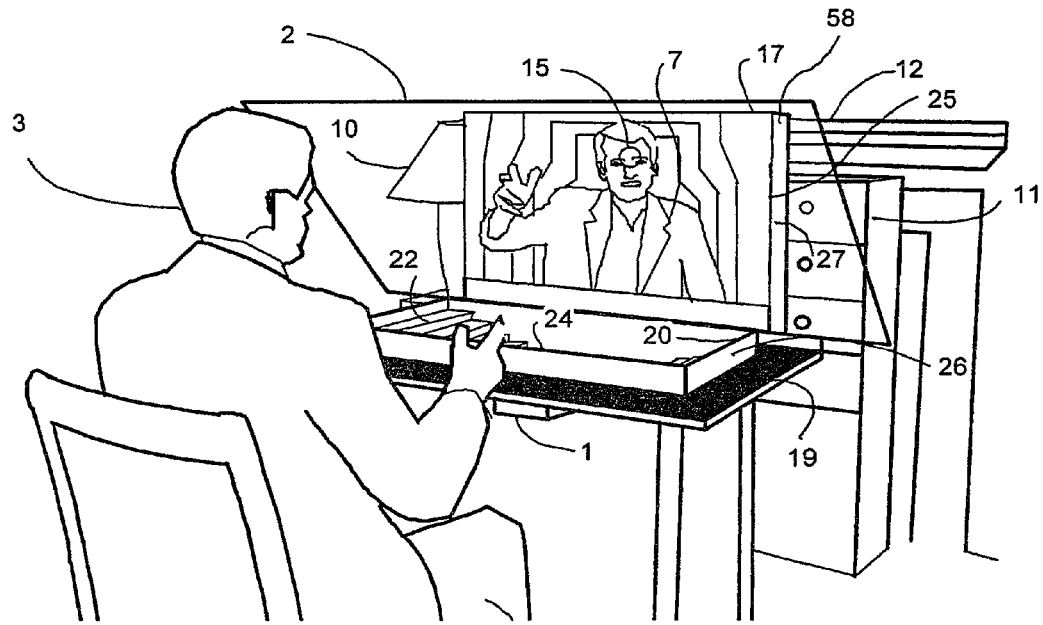
Fig. 9

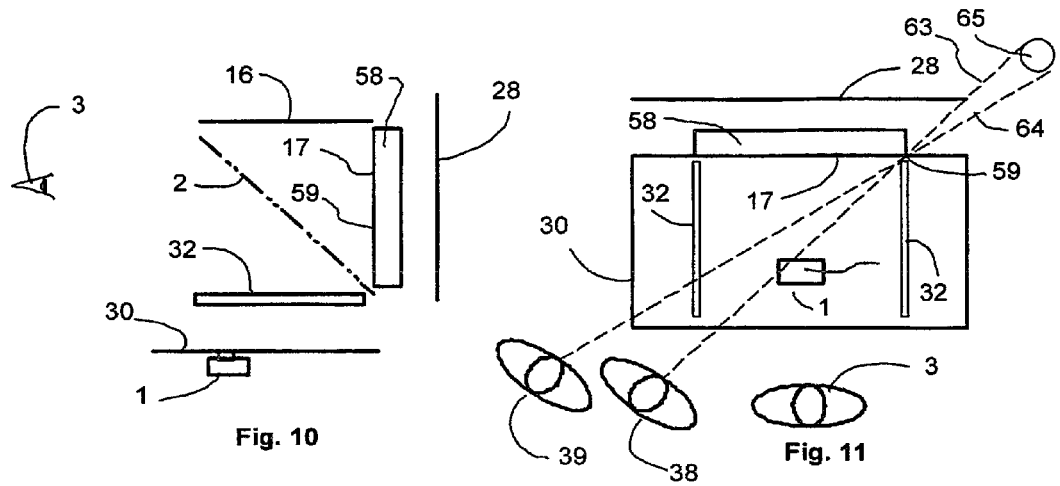
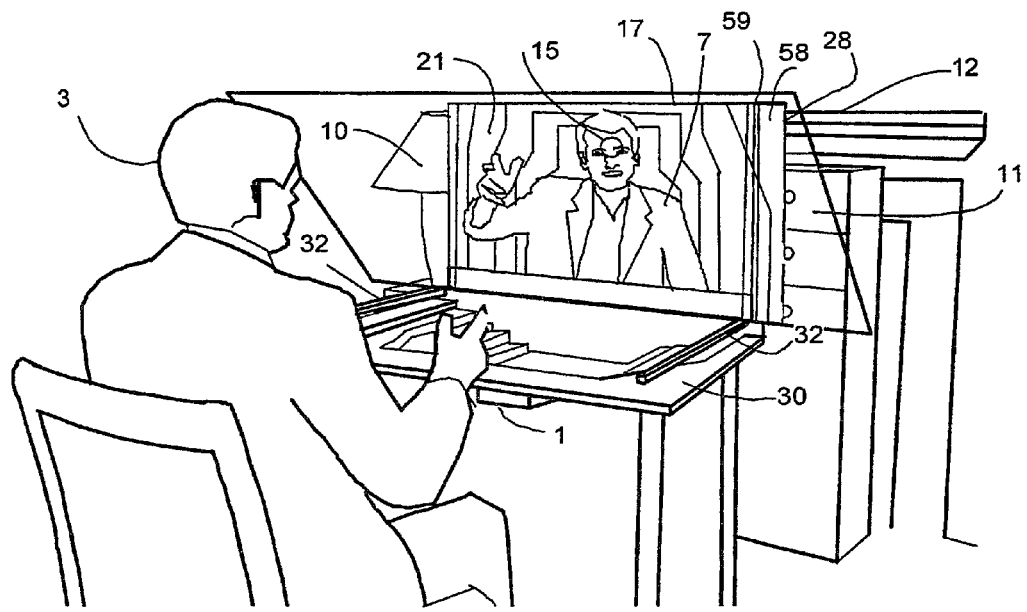

REFLECTED BACKDROP FOR COMMUNICATIONS SYSTEMS

This application is a divisional of and claims priority to non-provisional U.S. patent application Ser. No. 11/085,292 filed Mar. 21, 2005, which claims priority to non-provisional U.S. patent application Ser. No. 10/897,453, filed Jul. 23, 2004, which claims priority to provisional U.S. Patent Application Ser. No. 60/564,098, filed Apr. 21, 2004, which all applications are incorporated herein by reference in their entireties.

TECHNICAL FIELD

The present invention relates to video conferencing apparatus and more particularly to apparatus that displays the transmitted participant to appear to be in front of a backdrop and to have a perceived eye contact.

BACKGROUND

There is a need for a new type of distance communications system that achieves "telepresence" which is commonly understood to be a perception of presence of a person from a distant location. Telepresence covers a broad range of display and interactive technologies. Most configurations display a flat image on a screen or a monitor. The flat images produced by these products and display systems do not create the perception of the presence of the transmitted person in the three-dimensional setting of the receiving location.

The perception of the presence of a person within a room can be a powerful form of communication. Observers respond differently to an effective display of a life-size person in a three-dimensional setting compared to the common appearance of a person on a flat screen, such as normal television. In order to achieve this perception, the image of the person should not be contained by the appearance of the frame of a screen. This can be accomplished by having the distant person captured against a black background and superimposing the image with a backdrop and room setting appearing behind the person. With the proper balance of light on the backdrop and room setting, the image of the person can appear to be present in free space in front of the background.

An additional feature in achieving effective telepresence is the perception of eye contact. It is well known that eye contact can be simulated by positioning a camera on the opposite side of a two-way mirror so that it matches the reflected view of the line of sight of the displayed person from the distant location.

The combination of eye contact and the appearance in a three-dimensional setting were presented in the "Communications System" by White WO 01/11880 patent filed Aug. 10, 1999 and published Feb. 15, 2001 and U.S. patent application Ser. No. 10/049,253 filed Jul. 24, 2000, and incorporated herein by reference. These previous configurations have reflected an image of a life-size person so that it is superimposed into a three-dimensional setting. This setting, which is viewed through the two-way mirror, could incorporate a chair and background to give the perception that the person is in the room with the audience. This configuration requires that a large amount of space is dedicated to the display system, however.

Most prior art systems are large and bulky and, hence, cannot physically fit into most conference rooms. Thus, they are not acceptable for the majority of applications. Furthermore, the appearance of the transmitted person into a room setting poses many problems. Since the image of the transmitted person is superimposed into the room setting, any light surfaces or objects in the room setting will be visible through the image of the person. This will result in a "ghost" effect for the person. In order to control this visual effect, all of the background needs to be illuminated to an exact level of brightness. It is impractical to specially set the light levels and to select dark colors for all objects in the room for all applications other than theatrical settings. As a result, this configuration is generally unacceptable for normal business usage.

Even with producing custom room settings for these reflected image display systems, they have a fundamental problem caused by the location of the displayed image. Since the image of the person is reflected by the two-way mirror, the image display system is positioned between the observer and the mirror. As a result, the image on the image display system could be directly viewed by the observer. This would break the illusion of the presence of the person as seen in the reflection of the image in the two-way mirror. There are various methods for minimizing the view of the display system, such as using a micro louver film to block the image from the observation zone. However, these techniques are not totally effective and darken the image to half or less of its brightness. Darkening the image can be a serious problem in that the two-way mirror reflects only 30% to 50% percent of the light, causing the image to be only a small fraction of the brightness of the image display system. Due to the resulting low brightness of the image, the quality is unsatisfactory.

PRIOR ART CONFIGURATIONS

Previous configurations have achieved eye contact. The prior art of FIG. 1 illustrates a two-way mirror 2 that is angled so that it reflects an image display device 4, such as a monitor or screen. A two-way mirror is typically a partially silvered transparent substrate, which could be glass, plastic, Mylar or other transparent material. A two-way mirror has also been referred to as a one-way mirror or a beamsplitter. The reflected image 5 will appear to be behind the two-way mirror 2. A camera 1 is placed behind the two-way mirror in a position on the eye level of the person displayed on the reflection of the monitor. The camera is surrounded by an opaque enclosure 13 so that no light is viewed by the camera as a reflection on the two-way mirror. The inside of the enclosure is black so that the observer 3 does not see the camera or the enclosure through the two-way mirror and the only image visible to the observer is the reflection 5 of the image on the image display device 4. This results in the undesirable visual effect of the person displayed on the reflected image 5 appearing to be at the back of a black box.

The prior art of FIG. 2 shows a configuration where the camera 1 is positioned behind the location of the appearance of the reflected image 5 on the image display device 4. The camera 1 is positioned in a background within a three-dimensional setting. An overhead blackout panel 14 is positioned above the two-way mirror 2 so that the camera view of the reflection on the two-way mirror is of a black surface. In this manner, the only light exposing the image for the camera will be of the observation zone around the observer 3 on the opposite side of the two-way mirror 2.

FIG. 3 shows a perspective view of the prior art of FIG. 2. An image of a person from a remote location is displayed on an image display device 4. In this prior art, the image on the image display device 4 is in view of the observer 3, which is a distraction from the intended view of the reflection of the image of the transmitted person 6. If the image of the person in the remote location is produced with a black background, the frame of the reflected image 5 will not add light to the superimposed view of the background and the image of the person 6 will be viewed by the observer as a free standing image within the three-dimensional setting. A camera 1 may be placed in the room setting at a position that is at the eye level of the observer. Since the reflected image of the remote person 6 is superimposed into the scene of the room, the normally lit background 12 in the room will be seen through the image of the person 6. In particular, a light object, such as a lamp 10, would clearly show through to give a "ghost" quality to the image of the person 6.

A disadvantage of this configuration is that a color shift can take place when the reflection on the two-way mirror 2 is viewed from an angle of approximately 45 degrees. This color shift can cause the reflected image of the person 6 to appear green. Also, any imperfections or distortion in the two-way mirror 2 will cause the image of the person to be degraded. This can be a particular problem if the two-way mirror is comprised of plastic or Mylar substrate.

The prior art of FIG. 4 illustrates an image display device 17 showing an image of a person from a remote location, which can be viewed through a two-way mirror 2. The two-way mirror 2 is angled so that a camera 1 views a reflection of the observer 3 and the surrounding observation zone. The camera 1 is placed below a two-way mirror 2 at a position in the line of sight of the person displayed on the monitor. Above the two-way mirror is a black panel 16 that is in the camera view through the two-way mirror so that the only light exposing the image for the camera is the reflected view of the observation zone.

This prior art does not address the problems that may arise from the superimposing of the reflected image of the setting with the camera 1. In particular, the camera may be placed on a table or equipment rack that could be seen as a reflection in the two-way mirror. This would add an undesirable reflection of the table or equipment rack that would superimpose into the view of the image display area 17 as it is seen through the two-way mirror 2. To address this problem, it would be possible to surround the camera 1 with black material that would not superimpose light into the view. With this arrangement, the observer would view the flat image on the image display device 17 without light superimposing from the black setting below. While this would provide a clear view of the image on the image display device, it would only display a flat view that would not achieve the desired sense of presence with depth relationships.

Hence, there is a need for an improved system that addresses the shortcomings of the prior art mentioned above.

SUMMARY OF THE INVENTION

The problems and needs outlined above are addressed by preferred embodiments of the present invention. In accordance with one aspect of the present invention, there is provided a telepresence communication system for allowing a user located in an observation zone to communicate with a person using a communications system at another location, the telepresence communication system. The system includes an image display device having an image area substantially surrounded by an enclosure, the image area being positioned substantially within a vertical plane, the plane positioned for viewing by the user in an observation zone. A two-way mirror is positioned between the observation zone and the image display device and is angled to reflect a backdrop. The backdrop is positioned adjacent the two-way mirror so that the reflection of a left edge and a right edge of the backdrop in the two-way mirror substantially aligns with a left and right edge, respectively, of the image display enclosure when viewed from the observation zone. The system also includes a camera located in the backdrop, such that the camera views the observation zone as a reflection off the two-way mirror. The system further includes a light-absorbing panel positioned on the side of the two-way mirror opposite the camera and located in the view of the camera through the two-way mirror as the camera is aligned to view the reflection of the observation zone off the two-way mirror.

In another aspect, the present invention provides for a telepresence technologies configuration for allowing a user in a home location to see a substantially life-size image of a person from a remote location appearing in front of a backdrop within the room setting and achieving an apparent eye contact while allowing for two-way interaction in real time for communication. The configuration includes a first telepresence communications system to capture the video image and audio of the person in a remote location and a remote location codec to encode outgoing video image and audio signals and decode incoming video image and audio signals. The configuration further includes a network connection to transmit two-way communication signals between the home location and the remote location. The configuration also includes a home location codec to decode incoming video and audio signals from the remote location and code outgoing video image and audio signals for transmission to the remote location, and a second telepresence communications system in the home location to display an image of the person from the remote location on the image display device and project audio of the person from a speaker system.

In yet another aspect, the present invention provides for a telepresence technologies architecture for managing and facilitating telepresence communication for allowing a first user in a home location to see a substantially life-size image of a second user at remote location appearing in front of a backdrop within a room setting and achieving an apparent eye contact while allowing for two-way interaction in real time for communication. The telepresence technologies architecture includes a telepresence communications system to capture a video image and audio of the second user using a pre-determined telepresence standard that defines requirements for placement of a camera relative a user, placement of said user relative a background, and appearance of said background. The telepresence communications system in the remote location includes a codec to encode outgoing video image and audio signals and to decode incoming video image and audio signals. The architecture further includes a network connection from the remote location to a telepresence operations center, the telepresence operations center including network connections to other remote locations. Another feature of the architecture is a second network connection from the home location to the telepresence operations center, and a second codec in the home location to decode incoming video image and audio signals of the second user and to code video image and audio signals of the first user for transmission to the remote location via the telepresence operations center. The architecture further includes a second telepresence communications system in the home location, compatible with the pre-determined telepresence standard and configured to display, substantially life-size, the incoming images and audio signals of the second user in front of the backdrop and within a three-dimensional setting of the home location.

The present invention provides advantages over previous configurations that superimposed a reflected image of a person into the three-dimensional setting of a room. Since the preferred embodiments present invention allows for the direct viewing of an image on an image display system, the image is not degraded by a superimposed room background that could produce a ghost effect. Some previous configurations of a reflected image of a person used a physical backdrop behind the superimposed image of the transmitted person so that the room setting did not wash out the image. However, the requirement for a physical backdrop behind the image caused the display system to be excessively bulky. In contrast, the present invention is compact since the backdrop is reflected to appear behind the image on the image display system, which achieves the visual illusion of depth without requiring the actual physical depth. In this way, the embodiment of the invention is by comparison about half of the actual physical depth. This is especially important in that a preferred physical embodiment of this invention, as a fully functioning telepresence system, can be placed on casters and rolled through a standard single doorway without requiring any disassembly or folding up of the system.

Another advantage of preferred embodiments of the present invention is that the configuration can be folded up to become even more compact when not in usage. This makes it possible for the communications system to be stored in a small space.

Another advantage of the present invention is that the backdrop can be a backlit transparency. Since this backdrop image is preferably illuminated from behind, the brightness of the image will not be adversely affected by the ambient lighting in the room. The backlit illuminated transparency can be a graphic image, photographic image, montage or patterned surface that is optimal for brightness and composition to achieve the desired visual effect for the backdrop.

An embodiment of the invention could include the network connection, which could be over an ISDN network or an IP network. The output of the computer from the send location could be directed through the codec to transmit a computer image at the second image display device at the remote location.

Another aspect of the invention is the communication between two locations using telepresence communications systems. In this aspect, the system architecture incorporates a network connection between computers in each of the telepresence communication locations to establish interaction with data sharing applications. For optimizing the quality of the delivery of both the supporting computer generated visuals and the effective delivery of the video images of the telepresence systems, it is preferable to use an IP network that is optimized for telepresence. This telepresence network would need to meet specific requirements of a minimal latency and quality of service, which are currently not possible when transmitting on the public Internet and most virtual private networks.

In yet another aspect, the present invention provides for a telepresence technologies architecture that is connected by a telepresence network to a telepresence operations center. It would be possible to offer telepresence services from this telepresence operations center, including digital recording of incoming video and data presentations, playback of prerecorded sessions, chat room services and many other services. The customers connected to the telepresence operations center would be monitored and charged for the telepresence services delivered.

There are many advantages to the innovation of a telepresence technologies architecture comprised of telepresence communications systems connected by a telepresence enabled network to a dedicated telepresence operations center to delivery a variety of telepresence services: With this telepresence technologies architecture, the telepresence operations center could have the capability of recording presentations since the incoming video signal and the visual supporting content will flow through the telepresence operations center. This recorded video and saved visual display content could be digitally stored at the telepresence operations center for synchronized video and data playback for future usage.

An advantage of the telepresence technologies architecture is that all of the communication would flow through the telepresence operations center so that it would be possible to monitor usage and delivery of stored content. In this embodiment of the telepresence technologies architecture, the company managing the telepresence operations center could document usage and charge accordingly.

One advantage of this custom telepresence technologies architecture is that each location will be connected to the telepresence operations center, which will make it possible to deliver either live or prerecorded visual content from the telepresence operations center without any requirement to disconnect from one location and reconnect to another location. This could be especially effective for educational and training applications where prerecorded lectures could be delivered to educational facilities for the display of a life-size image of the instructor with the synchronized display of supporting visual content. At the end of the prerecorded lecture, the lecturer could be transmitted from his or her telepresence communications system in their home location to the telepresence operations center where their transmission would, in turn, be transmitted to the receiving location for live two-way interaction for questions and answers. As part of a service provided by the telepresence operations center a series of prerecorded lectures could be delivered to a number of locations at staggered intervals so that the lecturer could be connected to appear at each location consecutively at the end of the prerecorded lecture for a live session with each location individually. In this manner the lecturer could have his or her time maximized by having a "presence" at each location for two-way within a short amount of time. By way of example, a 45 minute prerecorded lecture could be followed by a 15 minute live session, which could be staggered so that the lecturer could complete a total of four sessions of 45 minute lectures followed by 15 minute live question and answers interaction at different locations around the world within a single hour. This capability is made practical and manageable with the telepresence technologies architecture as defined in this embodiment.

BRIEF DESCRIPTION OF THE DRAWINGS

The above features of the present invention will be more clearly understood from consideration of the following descriptions in connection with accompanying drawings in which:

FIG. 1. illustrates a prior art configuration displaying a reflected image of a person positioned in the line of sight of the observer to simulate eye contact;

FIG. 2. illustrates a prior art configuration displaying a reflected image of a person with a camera in the background setting;

FIG. 3. illustrates a prior art configuration in a perspective view of FIG. 2;

FIG. 4 illustrates a prior art configuration of a direct view of an image display device with a two-way mirror to reflect the camera view;

FIG. 5 illustrates the first embodiment of the present invention with the image of a person on an image display device at a first plane and a backdrop on a reflected second plane;

FIG. 6 illustrates a perspective view of FIG. 5;

FIG. 7. illustrates a second embodiment of the present invention with the front edges of the sides of the enclosure of the image display device that match to the reflected positions of extensions of the sides from the backdrop at the reflected second plane to the reflected first plane;

FIG. 8. illustrates a system with a backdrop comprised of multiple levels between the reflected first plane and the reflected second plane;

FIG. 9 illustrates a perspective view of FIG. 8;

FIG. 10 illustrates a third embodiment of the present invention with the width of the backdrop matching the width of a black area positioned at a second plane behind the first plane of the image on the image display system;

FIG. 11 illustrates a top view of FIG. 10;

FIG. 12 illustrates a perspective view of FIG. 11;

DETAILED DESCRIPTION OF ILLUSTRATIVE EMBODIMENTS

Figure 13:
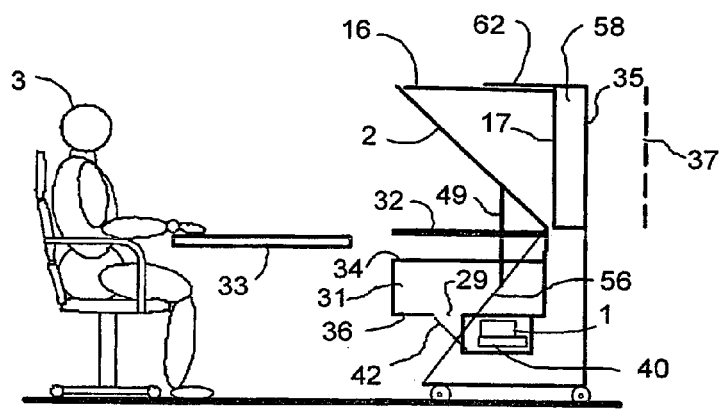
FIG. 13 illustrates a side view of a fourth embodiment of the present invention with three planes.

Embodiments and advantages of the invention will be discussed in general terms, first, followed by a more detailed description of specific preferred embodiments. The telepresence communications system is comprised of an image on an image display device, which is positioned directly behind the two-way mirror. The image display device may be a flat panel plasma or LCD monitor, rear projection video system, front projection on a screen or other image display method capable of displaying moving images. For the purpose of clarity, the vertical plane of the image on the image display system is described as a first plane. A second plane is described as a plane parallel to the first plane and further away from the user. A backdrop is positioned further away from the two-way mirror than the image on the image display device so that a reflection of the backdrop appears in the location of the second plane. The two-way mirror and the backdrop are set at angles that will result in the reflection of the backdrop appearing in a vertical orientation to match the location of the second plane. The user in the observation zone will see the superimposed images of the first plane comprised of the image on the image display device appearing in front of the second plane comprised of the reflected image of the backdrop.

A camera is located in the backdrop, such that the camera views the observation zone as a reflection off the two-way mirror. The camera could be positioned behind the backdrop with a view through an aperture for the lens to see through to the view of the reflection of the observation zone off the two-way mirror. A reflective mirror could be located behind an aperture in the backdrop in the view of the camera so that the camera views the observation zone as a reflection off the two-way mirror and the reflective mirror.

A light-absorbing panel could be positioned on the side of the two-way mirror opposite the camera and located in the view of the camera through the mirror as the camera is aligned to view the reflection of the observation zone off the two-way mirror. The light-absorbing panel could be a matte black fabric or other light-absorbing material to minimize the amount of light that would be superimposed with the view of the reflection of the view of the observation zone.

The camera could be positioned in the location where the view reflected off the two-way mirror would be approximately at the height of the eye level of a transmitted person appearing on the image of the image display device. In this way, the user looking at the eye level of the transmitted image of the person on the image display device would be looking in the direction of the reflected camera.

A black area, such as a panel covered with black material, matching the width of the backdrop could be positioned in the location of the second plane to match the superimposed image of the reflected backdrop. This would result in a view of the reflection of a backdrop comprised of an illuminated visible material, which would be more clearly visible to the user than the direct view of the black area. As a result, the user would see the direct view of the image on the image display device on the first plane in front of the reflected backdrop on the second plane with the backdrop and the two areas matching in width. Outside of the width of the backdrop and the black area, the user would see a direct view of the room setting to the sides. Part of the view could include a view through the two-way mirror to the room setting to the sides of the reflected backdrop. In this view, through the two-way mirror that is outside of the reflected backdrop, the objects surrounding the backdrop could reflect in the two-way mirror. Therefore, it is advantageous to have these objects, such as the supporting structure for the backdrop and the surrounding floor, to be dark in color and not highly illuminated.

The backdrop could be illuminated from the available room lighting or the telepresence system could have integrated lights to illuminate the backdrop. Alternatively, the backdrop could be comprised of a panel or panels with a transparency or transparencies displaying photographic or graphic images that are illuminated from behind. The backdrop could be comprised of one or more types of surfaces that in the reflected second plane could have a mixture of colors, patterns, textures and/or an undulation or variation in depth within the surface area to produce greater depth cues relative to the superimposed image on the first plane. Furthermore, the backdrop could have multiple planes extending back from the reflected second plane to display additional depth cues.

The configuration could have the backdrop located below the two-way mirror. Alternatively, the configuration could have the backdrop located above the two-way mirror. As a further alternative, the backdrop could be located to the side of the two-way mirror.

The image display device could have an exposed image area surrounded by a black enclosure to contain the image display device with the image area being positioned substantially within the first plane. The outer edges of the backdrop on the reflected second plane could be extended toward the two-way mirror to match the superimposed position of the left and right sides of the black enclosure at the first plane.

The image display device with an exposed image area could be surrounded by a black enclosure containing the image display device. The image area could be at the location of the first plane and the black enclosure would have edges at the first plane. The black enclosure could also have edges located at a second plane behind the first plane. The width of the black enclosure at the second plane would be wider so that the left and right edges would be within the view of the user from the observation zone. The backdrop could be positioned further away from the two-way mirror to be at a location that is reflected into a position of a third plane parallel to the second plane and behind the second plane. The left and right sides of the backdrop could extend from the reflected third plane to the reflected second plane. The locations of the left and right extended edges of the sides of the backdrop could match the width of the black enclosure at the second plane to superimpose within the view of the user from the observation zone. In this manner, the image displayed on the image display device on the first plane will be both in front of the left and right edges of the reflected backdrop at the second plane and, additionally, further in front of the middle of the backdrop superimposed in the third plane.

The preferred embodiment of the present invention is compact enough that it can fit within a standard aisle width in a store. This makes it ideal for usage in retail and commercial applications as a kiosk, information booth or product promotions display. The free floating image in the communications system is excellent for attracting attention to the life-size image of a person in a busy retail environment. It is also ideal for displaying floating graphic and product images for promotional purposes. The telepresence system could display prerecorded images of a life-size person to communicate messages or promote products. Alternatively, the telepresence system could transmit a person from a commercially operated telepresence operations center to engage in two-way telepresence communication with people standing in the observation zone in front of the kiosk.

The present invention preferably provides a sense of presence of the transmitted person, which can be very important for many business applications. In particular, banking applications can provide eye contact between a banker and a customer. This eye contact is important in maintaining trust and personal contact in the business relationship. The compact size of the embodiments of this invention makes it practical for uses in banking locations which have limited space.

In preferred embodiments, the present invention is scalable to a larger size, which is very important for communication with larger groups. In particular, the invention can display a group of people while providing eye contact and a sense of presence in a three-dimensional setting. It can also provide a large image area for one person to move in freely. This can be very useful for teaching applications where the teacher may want to move at the front of the room. The invention can incorporate the display of presentations, data and graphics to support the training, teaching or presentation activity. In some configurations the communications systems can be folded up into a carrying case.

In preferred embodiments, the present invention allows for the direct viewing of the room setting to the left and right of the reflected backdrop. This assures that the image does not appear to be at the back of a black box, which would be the case if side panels enclosed the image display device behind the two-way mirror. In an embodiment of the invention, lights can be incorporated in the back of the backdrop structure so that the room setting backdrop can be illuminated. This lighting of the background would assure that the observer would see the depth cues of the room setting at a properly illuminated light level and color temperature that is optimal for compatibility with the illuminated backdrop.

In some embodiments, the system can incorporate a second image display device, such as a plasma screen, LCD monitor or other computer/video display device. This second image display device can be positioned in front of the two-way mirror. The second image display device can display computer data, PowerPoint presentations, video, computer graphics or any other visual material that would be used to support the presentation of information. This "presentation screen" could be controlled from the remote location by the presenter at the remote location. In this manner, the telepresent person would appear to be controlling the "presentation screen" in the room with the observers. The sharing of visual information and data can make the communication much more effective for many applications. The presenter in the remote location can have an image display device in front of him or her. As he or she looks down at the image display device, their transmitted image at the location of the observers will see the telepresent person looking in the direction of the image display device in the room. In this manner, the relationship of the telepresent person and the display of visual information will have the correct orientation for natural and effective interaction.

An embodiment of the invention could be placed on a table. The configuration could have a black backdrop that would be ideal for the display of an incoming visual of a location where the person or people are appearing on a black background. This will be common for the image of a remote location. However, the ideal configuration for a system dedicated to sending a transmission would be to have a black backdrop. This send system could include a black background behind the presenter and could incorporate lights to achieve optimal illumination of the presenter.

The telepresence technologies architecture has the advantage of making new forms of face-to-face communications services possible. As an example, a large embodiment of the telepresence technologies architecture could encompass a vast number of telepresence users. Since the configuration would connect users through a telepresence operations center, it would be possible to quickly and effectively make connections between the telepresence users without separate dialing or inputting new IP addresses. This telepresence technologies architecture would make it possible to establish chat rooms and introduction services for people to meet face-to-face and get to know each other through natural human communication with eye contact and the personality revealed through facial expressions and body language. This could be especially valuable for lifelike and life-size telepresence services offering dating and intimate communication.

Another example of a telepresence technologies architecture application is for interviews for employment. Currently, video conferencing is occasionally used for interviews. However, video conferencing is not generally effective since the job applicant cannot make eye contact with the employer and the two-way interaction is not a natural face-to-face configuration. Furthermore, video conference services are not standardized and have many complexities in establishing connections between different users. By contrast, the embodiment of this invention in the telepresence technologies architecture solves these problems. Firstly, the telepresence display system would establish the correct eye contact and sense of presence of the job applicant to appear in the room with the employer. Additionally, the telepresence technologies architecture would resolve the problems of connectivity since all of the telepresence users would be connected to the telepresence operations center for reliable and standardized delivery. The applicant could go to any location in the world that has a telepresence communications system and be assured that their appearance in the room with the employer will meet the specific requirements of eye contact and quality of transmission.

A further example of the telepresence technologies architecture is an application in banking. Banks have tested video conferencing on customers and have found that customers have rejected video conferencing. They have objected to being viewed by a camera and can not establish trust with a banker that will not make eye contact. However, the telepresence technologies architecture could resolve these problems by bringing a life-size banker into the bank office to meet at a table to discuss banking with eye-to-eye contact. Most importantly, the customer could meet with the right person at their branch bank even though this bank manager may be located at the city headquarters. The telepresence technologies architecture could operate within the secure network of the bank for confidentiality of information. The bank could operate their own telepresence operations center as long as it meets the specific technical requirements to deliver life-size communication through telepresence.

Another example of the telepresence technologies architecture is the application of telepresence in the security field. Security companies use surveillance cameras to monitor activities in remote locations. However, they recognize that presence in a location is a deterrent to potential intruders. The usage of standard video conferencing would not provide a deterrent to intruders, since the video display on a monitor would not provide any sense of presence. However, the telepresence technologies architecture could overcome these problems. The display of a life-size security guard appearing at the guard station could give a person at the exterior of the property a realistic impression that a real guard was actually at the guard station. Through the configuration of the telepresence system networked to the telepresence operations center, it would be possible to deliver advanced and cost effective security services. Instead of having the real guard appearing at one location, it would be possible to have a prerecorded life-size image of the guard transmitted to numerous locations. Only when a predefined sensor is triggered will the real guard be transmitted to the location of the incident. Since the telepresence technologies architecture is configured to accommodate a central command of the telepresence network, the real guard could transmit to the site at the speed of light. As a telepresent person, the guard could look directly at any intruders with eye-to-eye contact at the location of the incident and could electronically control lights, doors and security measures at the location.

A further application of the telepresence technologies architecture is for communication with deaf people. Video conferencing has been used for communication between people who are deaf since the deaf people can see each other for communication through signing. However, video conferencing is not ideal for this application since it would be more effective with eye contact and interaction with a life-size person. Furthermore, video conferencing requires that each location is dialed individually.

The telepresence technologies architecture overcomes these problems by providing both the improved display of a person communicating through signing and completes the technical solution by connecting the participants through the telepresence operations center. A signing person can connect to another signing person through the telepresence operations center for face-to-face communication.

A further advantage of the telepresence technologies architecture is that a deaf signing person can connect to a signing interpreter through the telepresence operations center. The signing interpreter can have a face-to-face and life-size interaction for easy reading of the signing communication. The signing interpreter can provide a verbal translation for a third party who may have an audio only connection to the interpreter for two-way communication, which will be relayed to the deaf person. Alternatively, the third party could use a telepresence communications system connected to the telepresence operations center. The third party could see the deaf person and could hear the verbal translation provided by the interpreter.

Another advantage of the telepresence technologies architecture is that it could support communication between people speaking different languages. Participants would connect to the telepresence operations center with their telepresence communications systems where they will be connected for face-to-face telepresence communication. Additionally a connection will be made through the telepresence operations center to a translator at a third location who will hear the voices of the two participants. The translator could translate the speech of the first participant and provide a translation for the second participant. Conversely, the second participant could have his or her speech translated by the translator and spoken to the first participant. The telepresence technologies architecture could facilitate this translation service by providing the technical configuration to easily and effectively connect people of different languages for telepresence communication. One of the advantages of the telepresence technologies architecture is that the participants can have natural face-to-face communication that would make it easier for them to establish rapport through facial expressions and body language.

The telepresence technologies architecture could provide further advantages by integrating a speech to text capability that would be specifically configured to have the translator's verbal translation captured by a speech to text software and then have the resulting text appear on the second image display device on the telepresence communications system or as superimposed text over the image of the telepresent person. This innovation would allow the participants to maintain communication with the other participant by looking forward to the participant while at the same time seeing the written translation. In this embodiment of the invention, the participants may not need to have a verbal translation, since their translation would be visually presented for them within the visual display. In this manner, they could concentrate on the personal interaction with the telepresent person through eye contact and body language.

As language translation software is refined, it would be possible to have language translation software applications at the telepresence operations center that would be available to telepresence users. The software would eliminate the need for a translator as a third party. A first participant would speak in a first language, which would be interpreted and translated to a second language for the second participant. An important advantage of the telepresence technologies architecture is that neither of the participants would need to have either the language translation software at their locations. This software and the technical means to facilitate this capability would be integral to the services of the telepresence operations center.

Referring now to the drawings, wherein like reference numbers are used to designate like elements throughout the various views, several embodiments of the present invention are further described. The figures are not necessarily drawn to scale, and in some instances, the drawings have been exaggerated or simplified for illustrative purposes only. One of ordinary skill in the art will appreciate the many possible applications and variations of the present invention based on the following examples of possible embodiments of the present invention.

FIG. 5 shows an embodiment of the present invention with a displayed image 17 located at a first plane which is viewed by an observer 3 through a two-way mirror 2. A light colored or illuminated backdrop 8 is a distance from the two-way mirror 2 that is viewed as a reflection 9 at a second plane by the observer 3. The backdrop 8 is positioned further away from the two-way mirror 2 than the image on the image display device 17 so that the reflected backdrop 9 at the second plane will be seen by the observer 3 to appear to be behind the image 17 on the first plane. The camera 1 is positioned along the line of sight of the displayed image of the person from the remote location. The camera 1 may be placed behind the backdrop 8 with an aperture 29 for the lens to view through so that the camera 1 is not clearly visible to the user 3. A black panel 16 is placed above the two-way mirror 2 so that the camera view through the two-way mirror does not superimpose any light into the reflected view of the observation zone surrounding the observer 3.

FIG. 6 shows a perspective view of the configuration in FIG. 5. The image 7 of the person from the remote location is viewed directly through the two-way mirror 2. Since the image display area 17 is behind the two-way mirror, there is not the problem of the prior art FIG. 3, which had the distraction of the direct view of image 4 on the image display system. The image 7 of the remote person is preferably produced with a black background so that the surrounding frame 5 is not visibly illuminated. A camera 1 is placed in the backdrop 8. The reflected camera view 15 is in the line of sight of the displayed person 7 from the remote location. The camera view through the two-way mirror 2 is absorbed by an overhead black panel 16. The black panel 16 allows the camera to view the reflected observation zone surrounding the observer 3 without superimposing any light from the view through the two-way mirror 2.

Since the image display area 17 is viewed directly through the two-way mirror, the image 7 is clear and undistorted. With the prior art FIG. 3, any imperfections in the mirror would distort quality of the reflected image. This is particularly critical when the two-way mirror is on a plastic or Mylar substrate. By contrast, a slight imperfection in the reflection of a backdrop is not as critical as the focus of attention on the transmitted person 7. Another problem with the view of a reflection of an image in the prior is that the two-way mirror could introduce a color shift. However, the direct viewing through the two-way mirror is less prone to a color shift.

The light colored or illuminated backdrop 8 below the two-way mirror is viewed by the observer 3 as a reflection that appears to be located at the second plane behind the first plane with the image of the transmitted person 7 on the image display device. Therefore, there is an obvious depth relationship between the image of the transmitted person 7 and the reflected backdrop 9. This achieves the desired three-dimensional relationship that can produce a greater sense of presence.

The background 8 may have a pattern, texture or graphic design in order to provide depth cues for the observer 3 to clearly see the displayed image of the transmitted person 7 as being in front of the reflected backdrop 9. The backdrop may comprise a pattern of planes at different depths so that the displayed person is viewed relative to a three-dimensional setting appearing behind the person. The camera 1 could be incorporated into the back of the backdrop 8 so that it is in the line of sight for eye contact.

Since the reflected backdrop 9 and the displayed person 7 are viewed as two superimposed images, it is particularly advantageous that the brightness of the backdrop 8 is controlled. In this invention, the backdrop 8 is produced specifically to provide the correct level of brightness to effectively achieve the desired visual effect of a three-dimensional relationship of the displayed person 7 relative to the reflected backdrop 9. The backdrop 8 may be dark relative to the image of the person 7 so that it does not appear through the person 7 to cause a "ghost" effect. However, it may be bright enough to be clearly visible for the purpose of providing the depth cue of a three-dimensional setting relative to the person 7. Also, it may be bright enough to obscure the black portion of the screen surrounding the image of the remote person 7. In these ways, the backdrop achieves the desired telepresence effect.

The size of the backdrop 8 may be large enough to cover the full area of the image display device. Since the image display device 17 is viewed on a first plane in front of the reflected backdrop 9 on a second plane, a view somewhat to the side, instead of directly from the center of the screen, may require that the backdrop 8 is larger than the image display area 17. Otherwise, the backdrop might not be large enough to cover the full image of the image display device when viewed by an observer located off to the side.

Outside of the reflected view of the backdrop 9 will be a reflected view of the area surrounding the backdrop 18. In some cases, this reflection may be a view 18 of the floor and objects on the floor. This reflected image on the two-way mirror 2 of the surrounding area 18 may be distracting and undesirable if it is light enough to be viewed clearly as a reflection. For this reason, it is preferred that the table, supporting equipment and floor surrounding the backdrop 8 are dark in value and are not brightly illuminated.

FIG. 7 shows a black enclosure 58 containing an image display device with the exposed image area 17 viewed through the two-way mirror 2 by the observer 3. The image 17 is located at a first plane. A backdrop 24 is reflected in the two-way mirror 2 to appear as a reflected image 25 at a second plane. The left and right edges 20 of the backdrop extend toward the two-way mirror 2 to a position that is viewed as a reflection in the two-way mirror at the first plane to match the left and right front edges of the image display enclosure 58.

FIG. 8 shows multiple levels 22 of the backdrop between the front edge 20 and the back of the backdrop 24. This pattern may be used to establish a greater sense of depth as the backdrop is viewed as a reflected image extending from the first plane to the second plane 25. The steps back (i.e., the multiple levels) 22 may become smaller as they extend back to the second plane 25. In this way it may create a foreshortening effect, similar to that used in theatrical stage sets to create an increased sense of depth.

FIG. 9 is a perspective view of FIG. 8. In this illustration, the side of the black enclosure of image display device 58 matches the side of the backdrop 26. As viewed from any angle in front of the two-way mirror 2 the superimposed edges will match. In this way, the view of the full area of the image display enclosure 58 will be matched with the superimposed images of backdrop surfaces 20, 22 and 24 and the image of a person 7 within the image display area 17. The image of the person 7 on the first plane will appear to be in front of the reflected backdrop on the second plane 25, which will achieve a three-dimensional visual effect.

Another advantageous feature of this configuration is that the area to the left and the right of the black enclosure of image display device 58 will be visible through the two-way mirror 2 to the three-dimensional room setting 12. The area 19 outside of the backdrop area may be black so that it does not superimpose light to the view of the room setting 12 as the area 19 is seen as a reflection in the two-way mirror 2. The user 3 may also see a reflection of the floor in the two-way mirror 2. However, the floor may be dark and the room setting 12 may be light so that only the room setting 12 is visible in a view through the two-way mirror 2. Since the room setting 12 is seen through the two-way mirror 2, the sense of presence of the person 7 is enhanced by viewing the transmitted person 7 in the context of the depth cues of both a backdrop and a three-dimensional room setting.

Light objects 10 in the room setting will not adversely affect the quality of the image 7 of the transmitted person since the light object 10 is blocked by the image display enclosure 58. The superimposed image of the reflected backdrop 25 matches to the position of the image display enclosure 58 to provide the optimal brightness for the display of the image 7 while allowing the observer 3 to clearly see the objects 10 appearing to the side of the image display enclosure 58. In this manner, the observer 3 gains a perception of the three-dimensional setting of the room while having the controlled display of the image 7 against the superimposed image 25 of the backdrop.

The sides 26 of the backdrop may be a depth that will equal the depth of the sides 27 of the image display enclosure 58. In this way, the actual physical dimensions of the image display enclosure 58 will match the reflected backdrop in the superimposed view of both. This depth of the sides 26 and 27 may be minimal, such as 3" to 4" for the front portion of a rear projection television monitor or the depth of a plasma monitor.

In FIG. 10, a black panel 28 is physically located in a second plane behind or on the back of the image display enclosure 58. The exposed exterior of the image display enclosure 58 (other than the actual image display area 17) is preferably covered in a matte black surface to absorb light and minimize reflections. The black panel 28 is located the same distance away from the two-way mirror 2 as the backdrop 30 so that the reflection of the backdrop appears in the second plane to match to the position of the black panel 28.

In this illustration, an optional pair of protrusions 32 is positioned so that their reflection on the two-way mirror 2 matches the first plane of the front two edges 59 of the image display enclosure 58. The protrusions 32 reflect in the two-way mirror 2 to appear to be on the first plane in front of the reflected backdrop 28 on the second plane. Since the protrusions 32 match the perceived positions of the sides 59 of the image display enclosure 58, the reflection masks the edge 59 of the black enclosure image display device 58 from the observer 3. The protrusions 32 preferably contain lights that illuminate the backdrop 30 (and hence provide a controlled illumination of the backdrop 30 to achieve the preferred brightness to appear superimposed with the image 17).

FIG. 11 shows a plan view of FIG. 10. The backdrop 30 is the same width as the black panel 28 so that the reflection of the backdrop 30 in the two-way mirror 2 appears in the second plane to match the width of the black panel 28. The pair of protrusions 32, preferably containing lights, is positioned above the backdrop 30 in a location matching the width of the image display enclosure 58 at the front edges 59. The black panel 28 on the second plane is wider than the width of the image area 17 on the first plane so that an observer 3 would see the image area 17 contained within the width of the black panel 28 while viewing the depth relationship of the image area 17 on the first plane in front of the reflected backdrop in the position of the black panel 28.

An observer 38 located off to a side of the central axis could view the image area 17 on the first plane shifted to one side relative to the black panel 28 on the second plane. The observer 38 views from a position where the line of sight 63 passes the front edge 59 of the image display enclosure 58 on the first plane and also passes the right edge of the black panel 28 on the second plane. The observer 38 can view the three-dimensional depth cues of objects in the room setting, such as an object 65 close to the edge of the black panel 28. An observer 39 is located further to the side of the central axis and has a line of sight 64 that passes the front edge 59 of the image display enclosure 58 on the first plane. However, from the position of the observer 39 a portion of the view of the room setting close to the right edge of the black panel 28 on the second plane is blocked by the image display enclosure 58. From the position of observer 39 the object 65 would be blocked from view. Since the backdrop 30 is viewed as a reflection in the second plane at the width of the black panel 28, the observer 39 will see a portion of the view from the right edge of the reflected backdrop 30 to the line of sight 64 passing the right edge 59 as a section of the image display enclosure 58. This is an undesirable effect since the observer 39 would miss the view of some depth cues, such as an object 65. It would be possible to increase the width of the black panel 28 and the corresponding width of the backdrop 30, but this would decrease the view of the background. Therefore, it is logical to determine an optimal viewing angle for observers with the understanding that viewing from outside of this range of viewing would result in an undesirable visual effect.

FIG. 12 is a perspective view of FIGS. 10 and 11. The advantage of this configuration is that the appearance of the remote person 7 would not be contained within a box with sides matching to the front edge 59 of the image display enclosure 58. The image of the transmitted person 7 would appear to be on a first plane in front of the reflected backdrop 21 on a second plane and within the context of the room setting 12.

FIG. 13 shows an advanced embodiment of the invention with the displayed view for the observer 3 comprised of three planes. The closest plane is the first plane with the image 17 displayed on the image display device. Protrusions 32 incorporating lights are located in front of the two-way mirror 2 in a position to be reflected as superimposed reflections in the first plane. The second plane is behind the first plane at the location of the back edge 35 of the image display enclosure 58. The middle portion of the backdrop 36 reflects in the two-way mirror 2 at a location 37 further behind the second plane for the location of the third plane. In this embodiment, the backdrop has sides 31 that extend from the backdrop middle section 36 on the reflected third plane to the front edges of the sides 34 which match to the location of the reflected second plane. The width of the image display enclosure 58 at the back edges 35 on the second plane is the same as the width of the backdrop at the edges of the sides 34 reflected on the second plane. Both the back edges 35 and the backdrop edges 34 appear superimposed at the same location of the second plane. To the left and right of the area comprised of the image display enclosure 58 and the backdrop 36 and backdrop sides 31, the observer will see through the two-way mirror 2 to the room setting behind. In the area of the superimposed images of the image display device and the backdrop the observer will see three planes, comprised of the first plane of the image 17 on the image display device, the second plane of the matched edges of the back edge 35 of the image display enclosure and the forward edge 34 of the backdrop sides 31 and further back to a third plane formed by the back of the backdrop 36 viewed as a superimposed reflection in the location 37. The embodiment has a camera 1 and codec 40 positioned below the backdrop 36. The camera 1 views a reflection off a mirror 42 and sees through an aperture 29 in the backdrop 36. The two-way mirror 2 is held by a rod 49 that is supported by a diagonal structural member 56.

Figure 14:
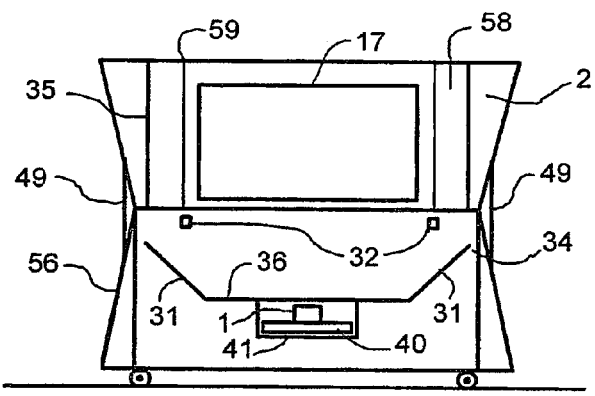
FIG. 14 illustrates a front view of the embodiment in FIG. 13.

FIG. 14 illustrates a: front view of the embodiment in FIG. 13. The protrusions holding the lights 32 are positioned at the same width as the front edges 59 of the image display enclosure 58. When viewed as a reflection on the two-way mirror 2 the protrusions 32 will appear superimposed on the first plane over the front edges 59 of the image display enclosure 58, which may help to obscure a direct view of the front edges as seen through the two-way mirror 2. Behind the first plane at the locations of a second plane is the back edge 35 of the image display enclosure 58 and the reflected view of the top edge 34 of the sides 31 of the backdrop. Further, behind is a third plane comprised of the reflected view of the back of the backdrop 36. A camera 1 and codec 40 are located below the backdrop 36 on a shelf 41.

Figure 15:
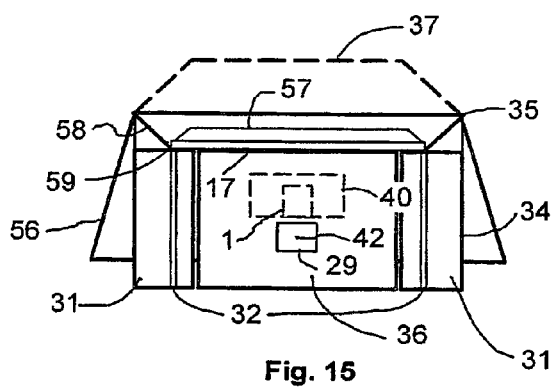
FIG. 15 illustrates a top view of the embodiment in FIGS. 13 and 14.

FIG. 15 illustrates a top view of the embodiment illustrated in FIGS. 13 and 14. This illustration shows the depth relationships of the three planes. The first plane is at the location of the image area 17 displayed on the image display device 57. The second plane is further behind at the location of the back edges 35 of the image display enclosure 58. The third plane is the furthest back at location 37, which is the reflected view of the middle of the backdrop 36. The camera 1 and codec 40 are located below the backdrop 36. The camera views a reflection off a mirror 42 and sees through an aperture 29.

Figure 16:
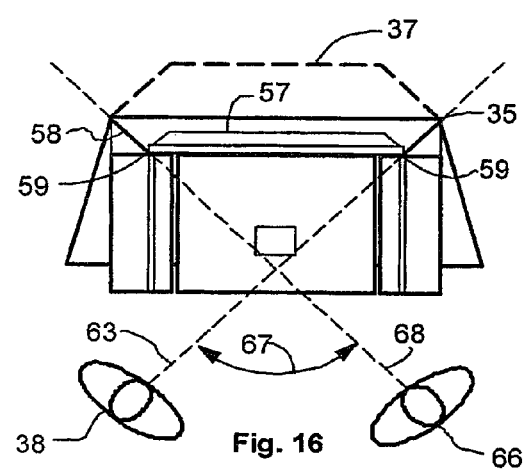
FIG. 16 illustrates optimal viewing angles for observers.

FIG. 16 illustrates the same top view of FIG. 15 with the addition of sight lines for observers. Observer 38 has a line of sight 63 that passes by the front edge 59 of the image display enclosure 58 and back edge 35 of the image display enclosure 58. Observer 66 on the opposite side has a line of sight 68 which also passes the front edge 59 and back edges 35. The preferred angle of view 67 has optimal viewing of the visual effect. In this illustration, the lines of sight 63 and 68 are each 45 degrees off the central axis for a total preferred viewing angle of 90 degrees.

Figure 17:
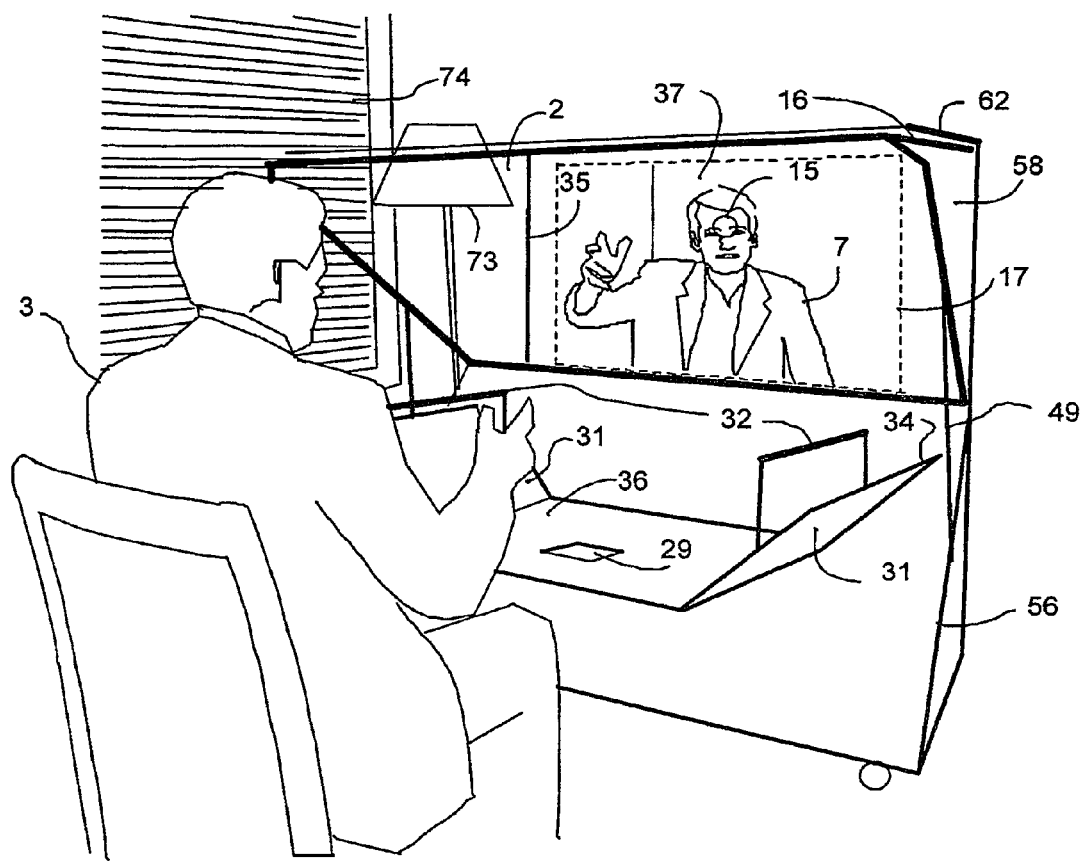
FIG. 17 illustrates a perspective view of the embodiment in FIGS. 13 through 16.

FIG. 17 illustrates a perspective view of the embodiment illustrated in FIGS. 13 through 16. The observer 3 views through the two-way mirror 2 to see the superimposed images on three planes, including a first plane with the image of a transmitted person 7 as displayed in the image display area 17. The second plane is comprised of the superimposed and matched locations of the back edge 35 of the enclosure of the image display device 58 and the reflected view of the top edge 34 of the sides of the backdrop 31. A third plane is furthest back comprised of the reflected view 37 of the backdrop 36. This perspective view illustrates the potential to see through the two-way mirror 2 to a background 74 that is to the left of the back edge 35 of the image display enclosure. In addition to the depth cues in the three planes showing the transmitted image of a person 7 and the backdrop panels 31 and 36, the observer 3 can see the depth relationship to the three-dimensional setting of the room. In particular, objects such as a lamp 73 can be a depth cue and contribute to the illusion that the transmitted person 7 is within the context of the three-dimensional room setting. All of the aforementioned visual effects contribute to a perception that the transmitted person 7 is actually in the room and engaging with face-to-face communication with eye contact with the observer 3.

Figure 18:
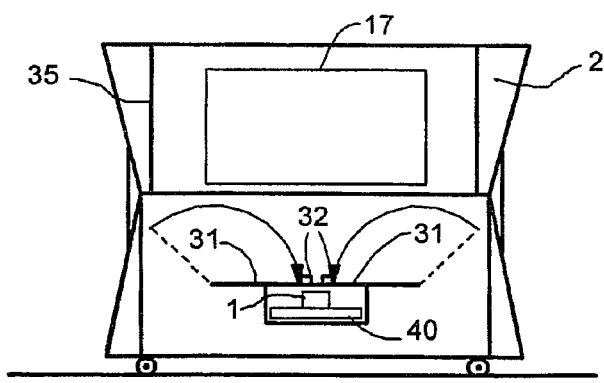
FIG. 18 illustrates a front view of the side panels and lights folded inward.
Figure 19:
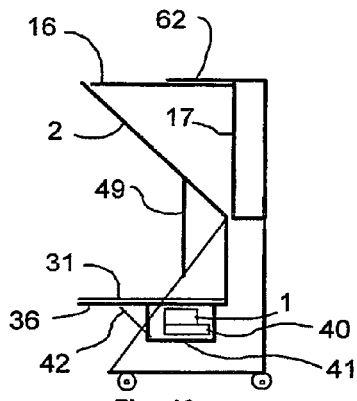
FIG. 19 illustrates a side view with the side panels and lights folded inward.
Figure 20:
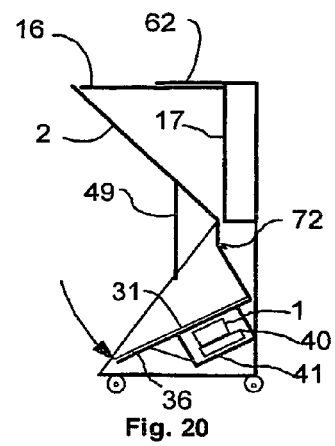
FIG. 20 illustrates the backdrop with the camera and codec rotated down.

FIG. 18 illustrates a front view of the embodiment with the side panels of the backdrop 31 and the light structures 32 folded inward. FIG. 19 is a side view of the same embodiment with the side panels 31 folded inward. FIG. 20 shows the backdrop comprising the back panel 36 and the sides 31 folded back at pivot point 72. A pair of hinges may be used at position 72 to rotate down the backdrop assembly. The camera 1 and codec 40 are attached to shelf 41 to hold them in position.

Figure 21:
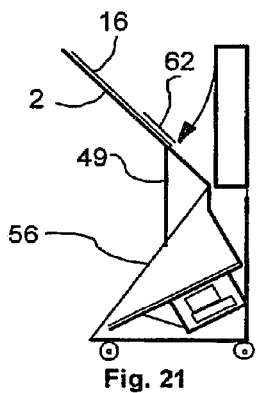
FIG. 21 illustrates the overhead panel and additional panel rotated downward.
Figure 22:
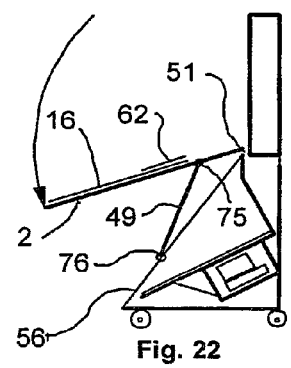
FIG. 22 illustrates the two-way mirror rotated part way downward with the sliding supporting component.

FIG. 21 shows the overhead black panel 16 and the attached overhead extension panel 62 rotated downward. FIG. 22 illustrates the two-way mirror 2 with the overhead panel 16 and overhead extension panel 62 in the process of being rotated downward at pivot point 51. A pair of hinges may be used at pivot point 51 for rotating the two-way mirror assembly. The supporting rod 49 may be attached to a fixed position on the frame of the two-way mirror 2 with a rotating mechanism 75. The rotating mechanism may be ball joint to allow for a complex angular movement of the angled edge of the two-way mirror 2 as it is lowered. The lower edge of the structural rod 49 may comprise a slider mechanism 76 that glides on the diagonal structural member 56.

Figure 23:
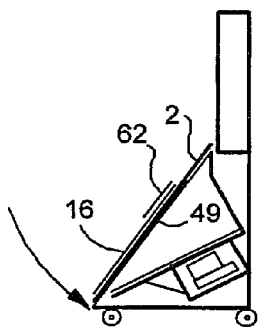
FIG. 23 illustrates the two-way mirror in a closed position with a cover of the overhead panel.
Figure 24:
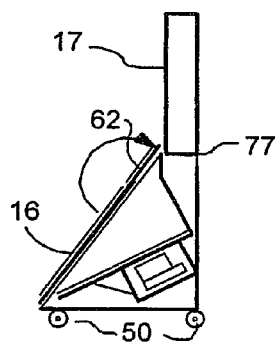
FIG. 24 illustrates the additional panel rotated upward to cover the rest of the two-way mirror.

FIG. 23 illustrates the two-way mirror 2 lowered to a position parallel with the diagonal structural member 49 with the overhead panel 16 and overhead extension panel 62 on top. FIG. 24 shows the overhead extension panel 62 rotated upward to cover the two-way mirror 2. In this closed position, the image display area 17 in the image display enclosure 58 is in clear view for the display of normal video or computer display material. In this closed position, the total system may be narrow enough to roll through a standard single door with the communications system on casters 50.

Figure 25:
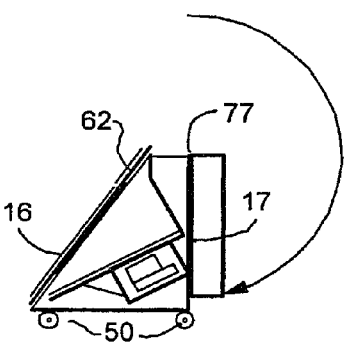
FIG. 25 illustrates the monitor enclosure rotated downward for shipping.

FIG. 25 shows the enclosure 58 for the image display device rotated downward at pivot point 77. In this arrangement, the system is compact for placement in a shipping container for shipping.

Figure 26:
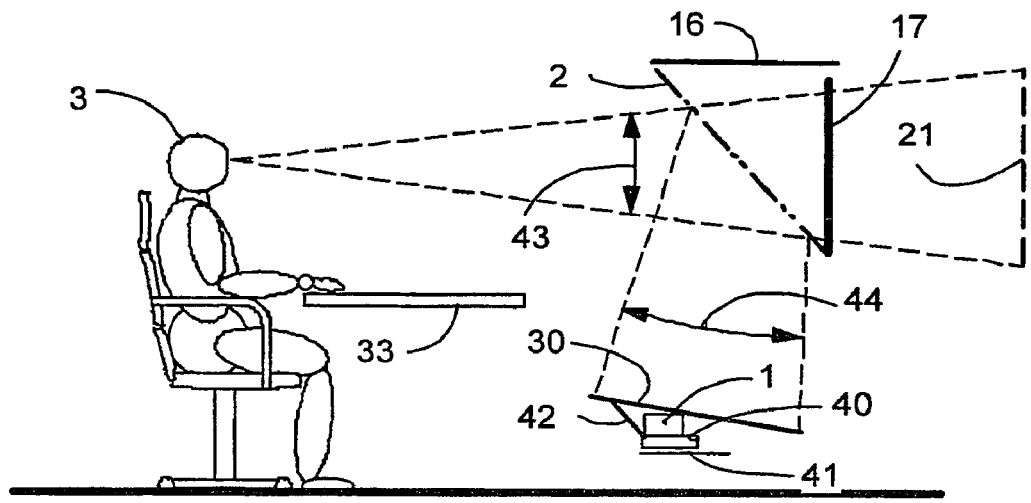
FIG. 26 illustrates a user's view of a system.

FIG. 26 shows an observer 3 seated at a table 33 with an angle of view 43 looking forward to see an image 17 displayed on an image display device on a first plane with a reflected backdrop 21 superimposed behind on a second plane. Along this same angle of view 43 the observer 3 sees a view 44 of a reflection of a backdrop 30, which is located below the two-way mirror 2. The reflection appears on a second plane that is in a location 21 behind the first plane of the image on the image display device 17. A camera 1 is placed on a shelf 41 that is incorporated into the backdrop 30. The camera 1 could be attached to a codec 40. A mirror 42 is positioned in the path of the view of the camera 1. The two-way mirror could be angled at 45 degrees so that a horizontal backdrop would appear to be vertical in the reflection. However, in this illustration, the two-way mirror 2 is angled at 50 degrees with the backdrop at 10 degrees from horizontal. Other variations in angles could be implemented to achieve an end result of a reflection of a vertical superimposed backdrop at the second plane 21.

Figure 27:
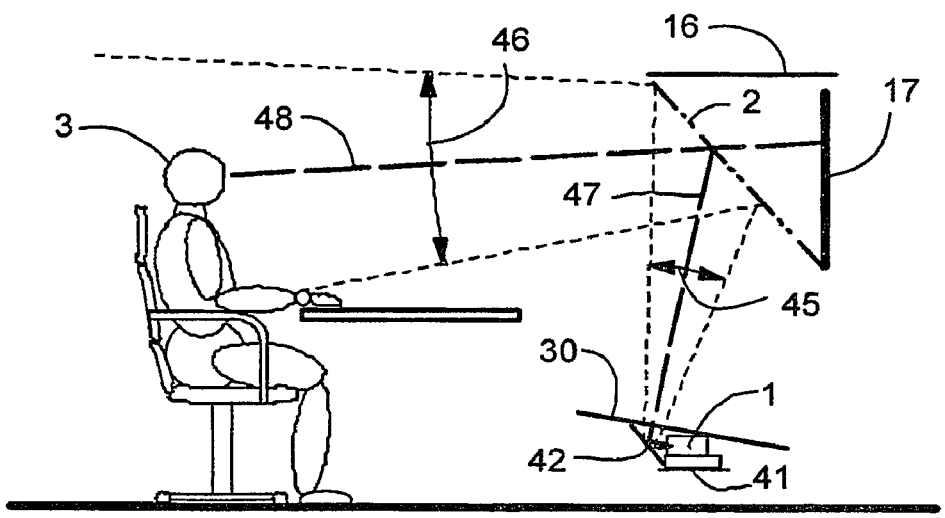
FIG. 27 illustrates the camera view of a system.

FIG. 27 shows the angle of the view 45 of the camera 1 as it is reflected off the mirror 42 directly in front of the camera 1. For the best quality of image the mirror 42 may be a front surface mirror to eliminate any unwanted secondary reflection that could be a problem with a normal glass mirror. The mirror 42 is angled so that the camera will see the angle of view 46 of the observation zone as a reflection off the two-way mirror 2. Since the mirror 42 is added in front of the camera 1, it is possible for the camera to be placed in a horizontal position on a shelf 41. This has the advantage that it is easier to place a camera 1 on a horizontal shelf 41 than securing it to a supporting structure to hold it in a vertical orientation. Another advantage of the mirror 42 is that it eliminates the problem of capturing a reversed image as would result from a single reflection off the two-way mirror 2. The double reflection results in an image captured by the camera 1 that is not inverted or flipped. This illustration shows that the direction 47 of camera 1 views a line of sight 48 that aligns with the eyes of a transmitted person appearing on the image display area 17. It is not necessary for the observer 3 and the transmitted person to be at the same height since eye contact can be achieved with the correct position of the camera at the eye level of the displayed person.

Figure 28:
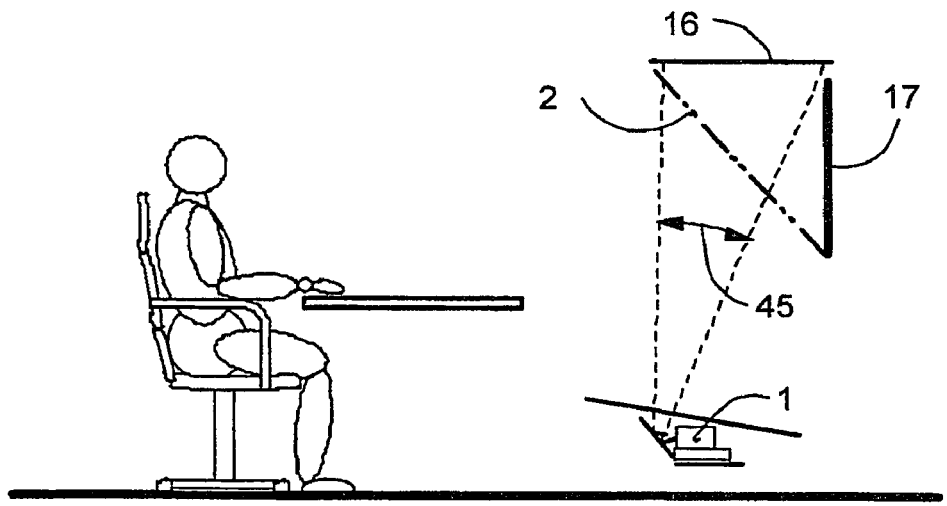
FIG. 28 illustrates the camera view through the two-way mirror to a black panel.

FIG. 28 shows the path of the view of the camera 45 as it views through the two-way mirror 2 to the black panel 16 positioned above the two-way mirror 2. In this way, extraneous light and non-essential images (e.g., the ceiling) that would detract from observation of the desired image are minimized.

Figure 29:
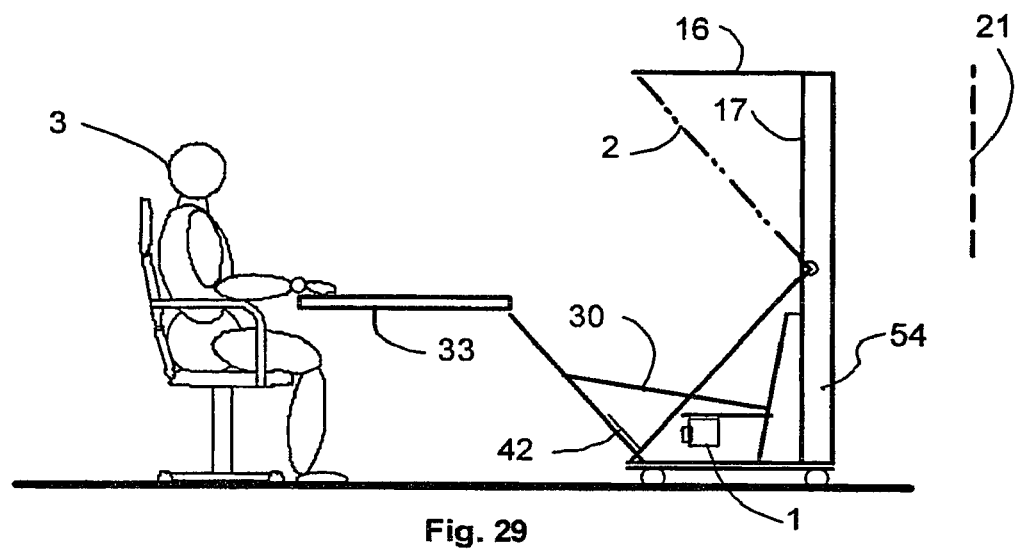
FIG. 29 illustrates a side view of a system at a table.

FIG. 29 shows an embodiment of the invention in an enclosure 54 with an observer 3 seated at a table 33. The image display area 17 on a first plane displays a portion of a life size image of a person from a remote location. The camera 1 is positioned in a backdrop 30 below the two-way mirror 2. The camera 1 is positioned to be horizontal so that it views the reflection off a mirror 42. A black overhead panel 16 is above the two-way mirror 2. The reflected image of the backdrop 30 is viewed on a second plane as a superimposed image 21 behind the first plane of the remote person displayed on the image display area 17.

Figure 30:
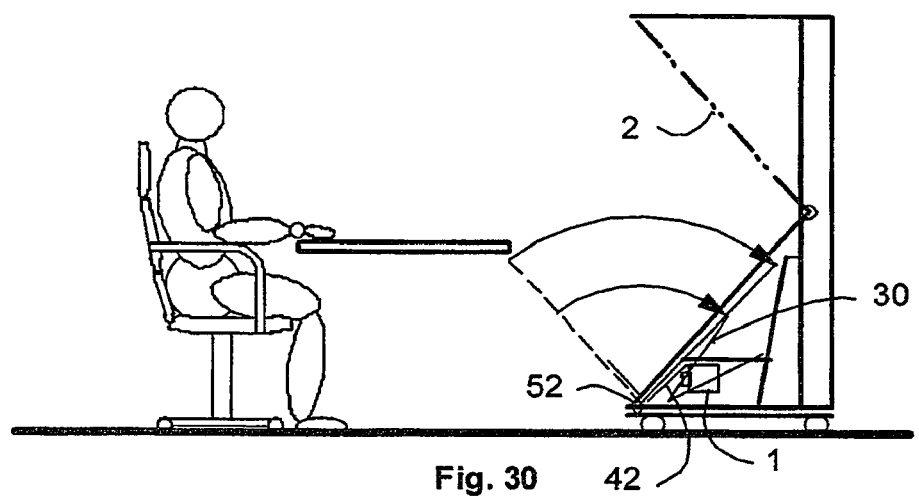
FIG. 30 illustrates the folding up of the backdrop panel.

FIG. 30 shows a portion of the backdrop 30 rotated on a pivot point 52 so that it can be folded back when the system is not in use. The mirror 42 for the camera 1 rotates back with the portion of the backdrop.

Figure 31:
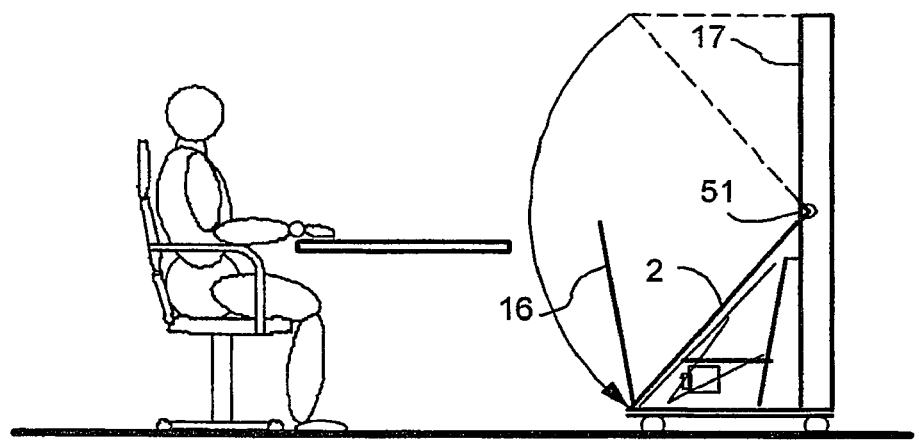
FIG. 31 illustrates the folding down of the two-way mirror.

FIG. 31 shows the two-way mirror 2 rotated on a pivot point 51 to fold down to the lower position.

Figure 32:
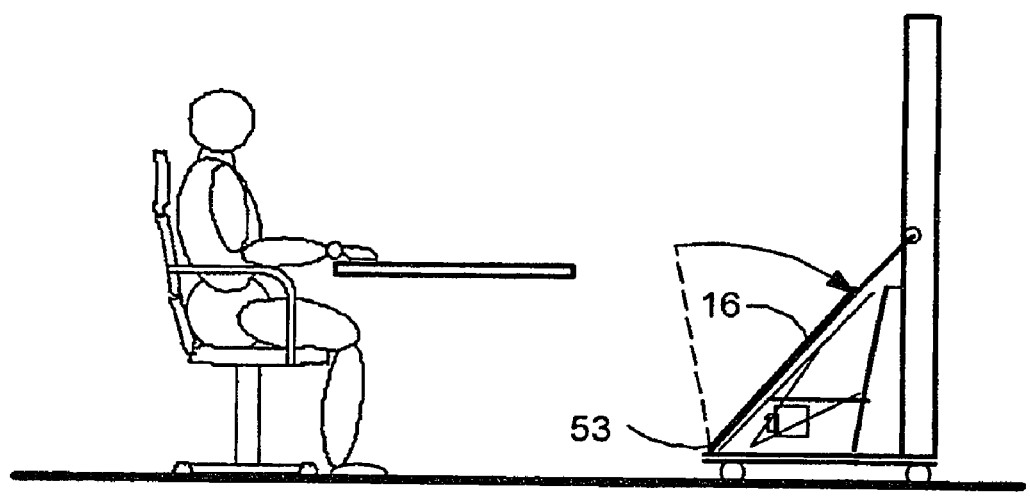
FIG. 32 illustrates the folding in of the overhead black panel.

FIG. 32 shows the black overhead panel 16 folded back along a pivot point 53.

Figure 33:
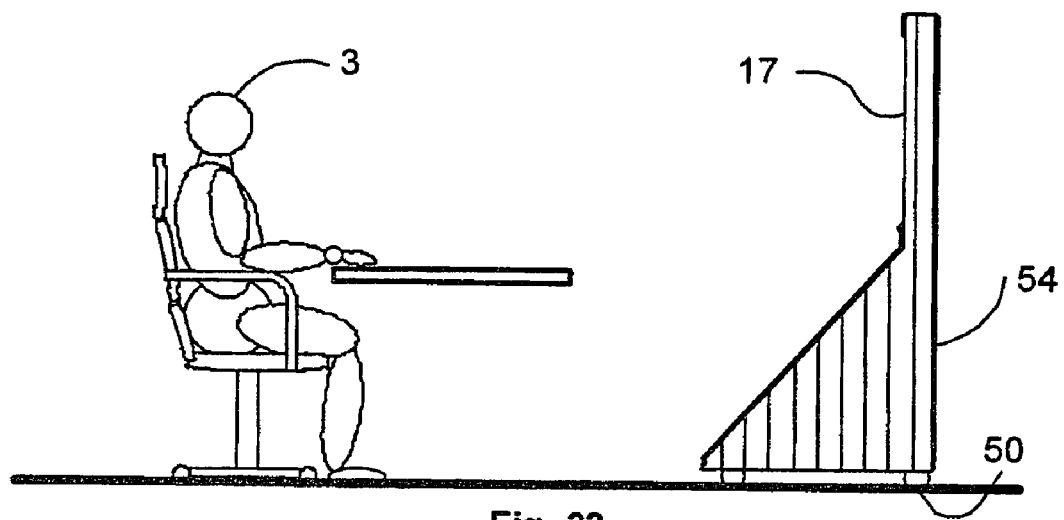
FIG. 33 illustrates a closed system with the potential of direct viewing on the image display system.

FIG. 33 shows the system in a closed position to contain the specialist display technology within the enclosure 54. The observer 3 can view the image display area 17 directly for normal viewing of video or computer images. The system is on casters 50 so that it can be rolled to another location. The system could be narrow enough to fit through an opening for a single door.

Figure 34:
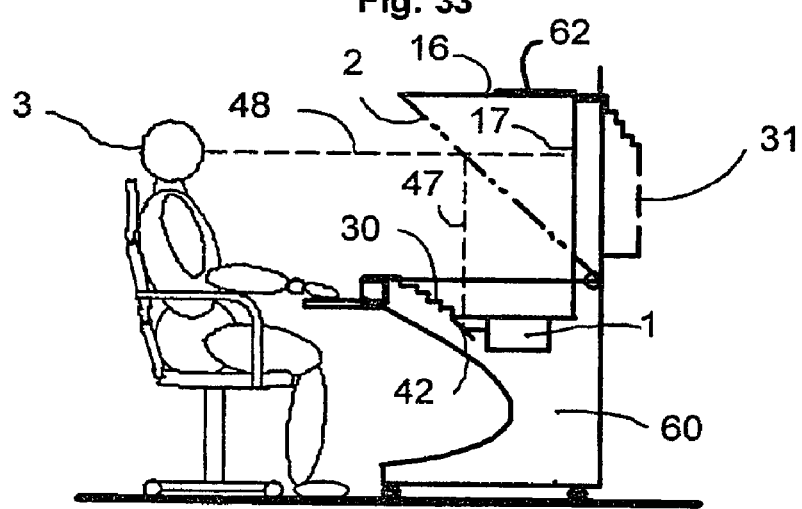
FIG. 34 illustrates an embodiment of the invention as a desk communications system.

FIG. 34 shows a configuration that provides a combination of a desk and a display system within a single enclosure 60. The two-way mirror 2 reflects a backdrop 30 that is integrated into the desk. The camera 1 is positioned horizontally with a mirror 42 in front of it so that the line of eye contact 48 is reflected 47 to the camera 1. A black panel 16 is positioned above the two-way mirror 2. The reflection of the backdrop 31 appears to be on a second plane behind the image display area 17 on a first plane.

Figure 35:
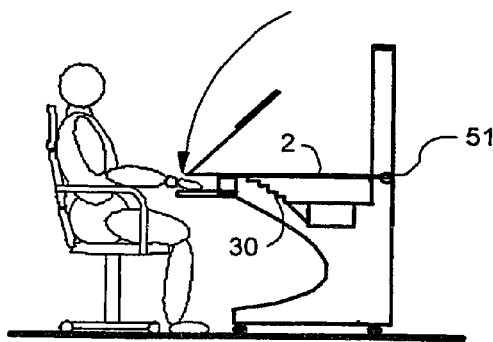
FIG. 35 illustrates the folding down of the two-way mirror.

FIG. 35 shows the two-way mirror 2 folded down on a pivot point 51 to lay horizontal on the top of the backdrop 30.

Figure 36:
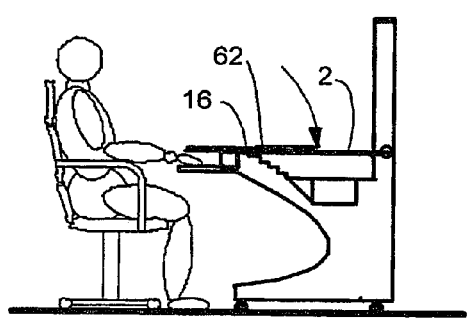
FIG. 36 illustrates the folding down of the overhead black panel.

FIG. 36 shows the black overhead panel 16 folded down to lay horizontal on top of the two-way mirror 2.

Figure 37:
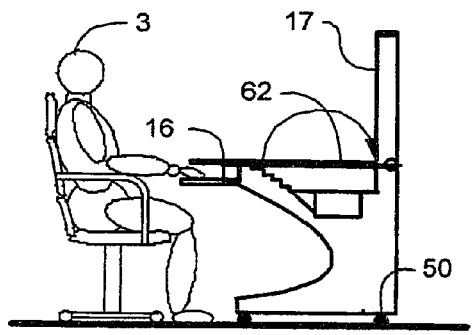
FIG. 37 illustrates the folding forward of an upper section of panel to complete a desktop surface and potential for direct viewing of the image display system.

FIG. 37 shows an additional section of panel 62 that is flipped over to cover the remainder of the horizontal surface. The exposed top of the black panels 16 and 62 could be comprised of a material that is well suited to form the top of the desk. In this closed position, the observer 3 could directly view the image display area 17.

Figure 38:
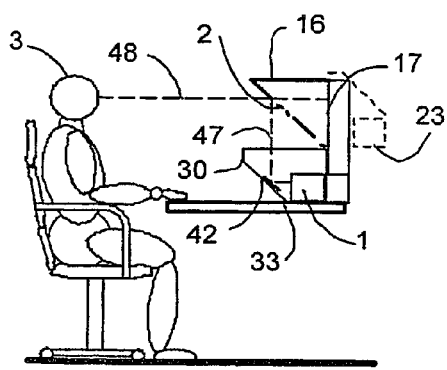
FIG. 38 illustrates an embodiment of the invention that is small enough to be placed on a table or desk.

FIG. 38 shows an embodiment of the invention that can be placed on a table or desk 33. The system has a two-way mirror 2 that is angled to reflect a backdrop 30. A camera 1 is positioned in the backdrop 30. The camera 1 is horizontal with a mirror 42 in front that is angled upward along a line of sight 47 toward the two-way mirror 2 so that it matches the line of sight 48 for eye contact with the observer 3. A black overhead panel 16 is in the camera view as seen through the two-way minor 2. The reflected backdrop 23 on a second plane appears to be behind the image display area 17 on a first plane.

Figure 39:
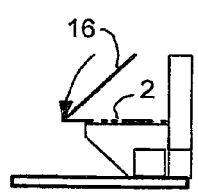
FIG. 39 illustrates the folding down of the two-way mirror.
Figure 40:
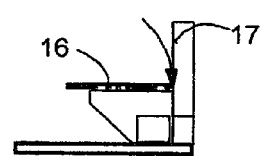
FIG. 40 illustrates the folding down of the overhead black panel for direct viewing of the image display system.

FIG. 39 shows the two-way mirror 2 lowered to a horizontal position with the black panel 16 attached. FIG. 40 shows the two-way mirror 2 and black panel 16 lowered to allow the observer to directly view video or computer images on the image display area 17.

Figure 41:
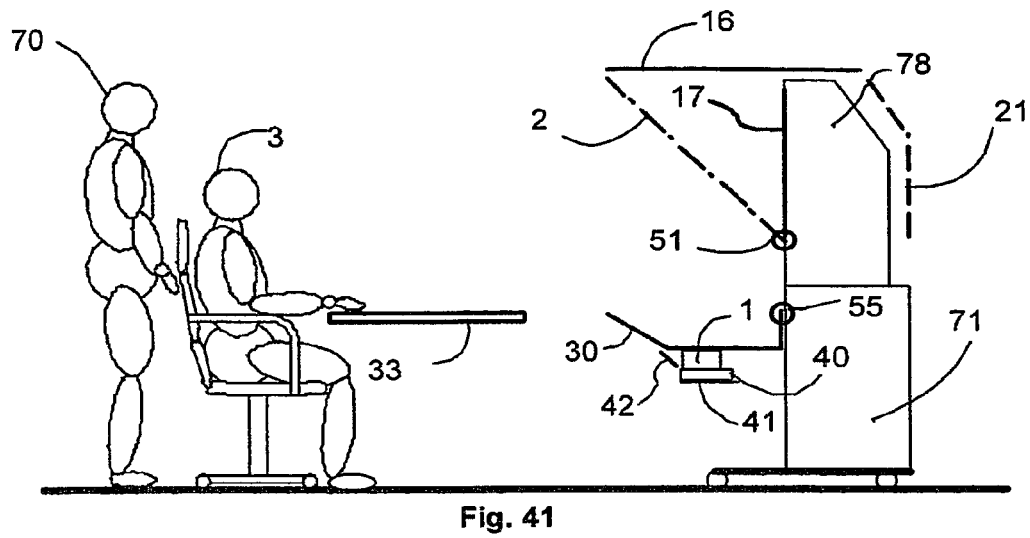
FIG. 41 illustrates an embodiment of the invention with a large rear projection image display system.

FIG. 41 shows an embodiment of the invention that is at a height that is somewhat higher than eye level for a seated person so that the display can be viewed by either a seated observer 3 or a standing observer 70. In this embodiment, the image display device 78 is a rear projection video display system that is supported on a base unit 71. The two-way mirror 2 is connected to a base unit with a hinge or other pivoting device 51. A backdrop 30 is connected to the base unit 71 with a pivoting device 55. A camera 1 is in a horizontal orientation and is placed on a shelf 41 that is incorporated into the backdrop 30. A mirror 42 in front of the camera is at an angle so that the camera views the reflection of the observation zone with the observer 3. An overhead black panel 16 is positioned above the two-way mirror 2 to block any light from exposing the view of the camera 1 through the two-way mirror.

Figure 42:
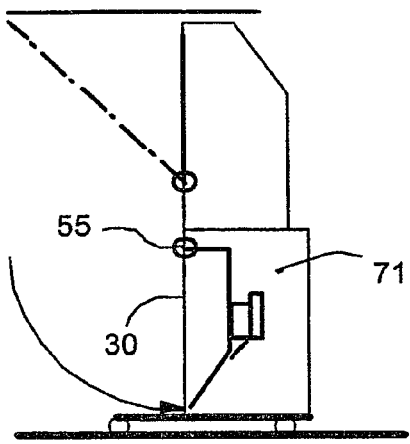
FIG. 42 illustrates the folding down of the backdrop.

FIG. 42 shows the backdrop 30 rotated at a pivot point 55 to a position within the base unit 71.

Figure 43:
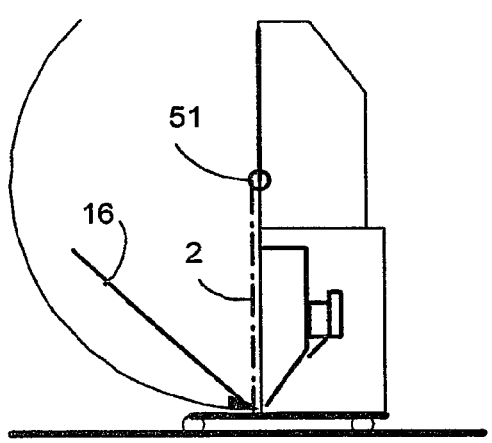
FIG. 43 illustrates the folding down of the two-way mirror.
Figure 44:
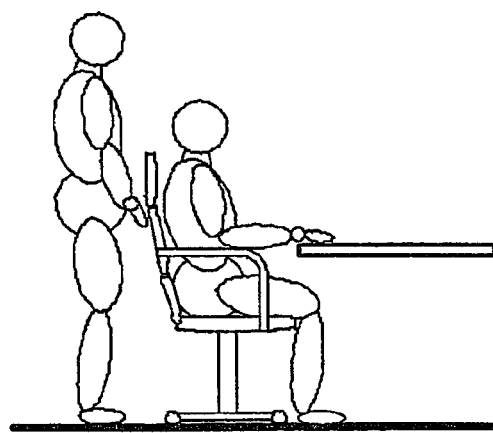
FIG. 44 illustrates the folding in of the black backdrop.

FIG. 43 shows the two-way mirror 2 rotated down at a pivot point 51 to a vertical position with the overhead black panel 16 attached. FIG. 44 shows the overhead black panel 16 rotated along the front edge of the two-way mirror 53 to a vertical position in front of the two-way mirror 2. The exposed surface of the black overhead panel 16 could be comprised of a material that provides protection of the two-way mirror 2 and is aesthetically pleasing for the exposed front of the system. In this closed position, the image display area 17 is in clear view of the observers 3 and 70 so that it can be used for the display of normal video and computer graphics using the image display device 78. The system is on casters 50 so that the system could be rolled into a room for usage. The system could be narrow enough to roll through an opening for a single door.

Figure 45:
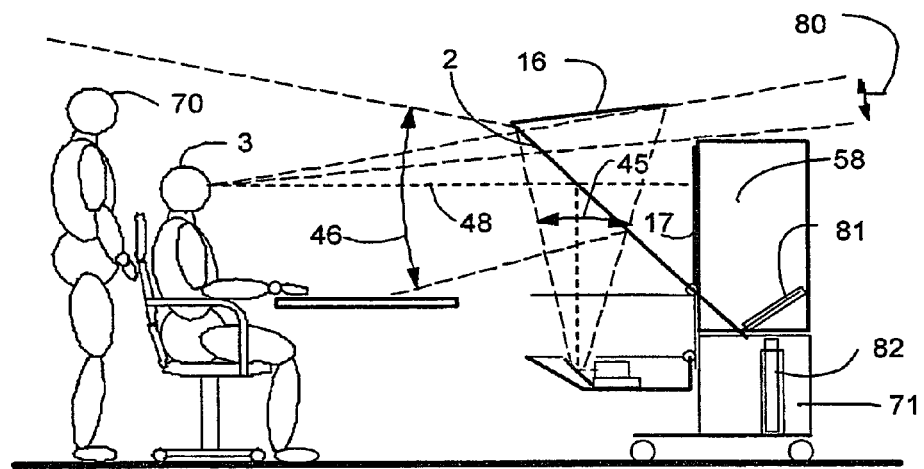
FIG. 45 illustrates the usage of an embodiment of the invention with the image of a person on the image display system at eye level.

FIG. 45 shows an embodiment of the invention that matches the line of sight 48 of a seated observer 3 with the height of the eye level of a person displayed on the image display area 17. Since the display is at eye level for a seated person, it is necessary for the two-way mirror 2 to be longer than the configuration illustrated in FIG. 41 through 44 so that a standing person 70 can view the image display area 17. The base unit 71 could have a mechanical device 82 that could raise and lower the communication system. In this way, the image of the transmitted person could be raised for horizontal eye contact with a standing observer 70 or lowered for horizontal eye contact with a seated observer 3.

In this configuration, the black overhead panel 16 preferably does not extend to the top of the image display enclosure 58. The smaller size overhead panel 16 is adequate to block light within the angle of view 45 of the camera 1. The black overhead panel 16 could be angled so that it does not block the view from the position of the observer 3. The observer could see a view 80 through to the space between the image display enclosure 58 and the black overhead panel 16 so that the image of the displayed remote person does not appear to be confined by the black overhead panel 16. This would increase the perception of a sense of presence of the remote person within the three-dimensional setting of the room.

Figure 46:
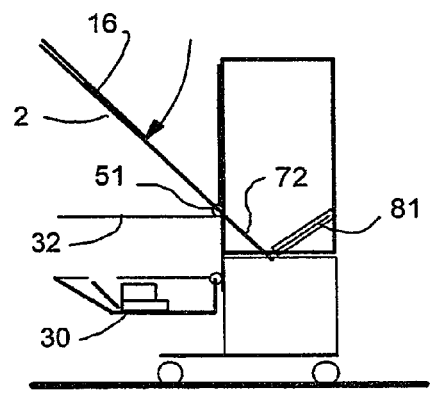
FIG. 46 illustrates the overhead black panel folding down.
Figure 47:
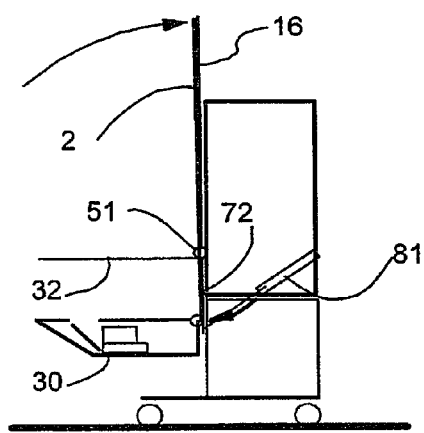
FIG. 47 illustrates the two-way mirror folding up.
Figure 48:
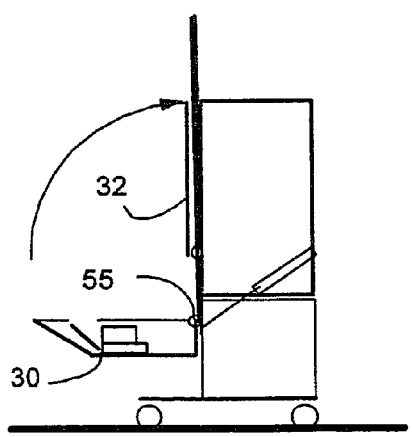
FIG. 48 illustrates the lights folding up.
Figure 49:
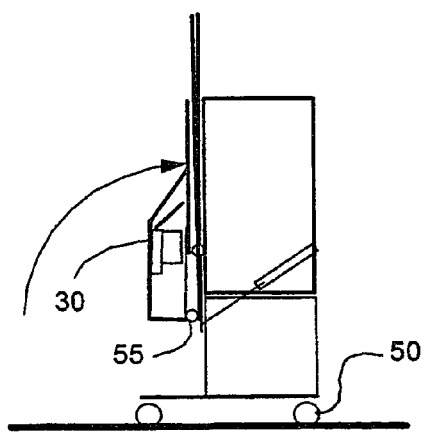
FIG. 49 illustrates the backdrop folding up.

FIG. 46 shows the black overhead panel 16 rotated down as an initial step of closing the system for storage or moving. The two-way mirror 2 is held by a structure 72, which extends beyond the pivot point 51. FIG. 47 shows the two-way mirror 2 rotated upward at the pivot point 51 to a vertical position. The structure 72 holding the two-way mirror 2 extends below the position of rotation 51. A mechanical device 81 (e.g., a pneumatic cylinder or spring-loaded device) could be attached to the structure 72 at the end of the extension below the position of rotation 51, to assist in raising the two-way mirror 2. FIG. 48 shows the pair of protrusions 32, preferably including illumination sources, raised to a vertical position. FIG. 49 shows the backdrop 30 raised to a vertical position from pivot point 55. In this closed arrangement the communication system could be narrow enough to fit through a standard single door opening. The communication system is preferably on casters 50 to make it easy to move.

Figure 50:
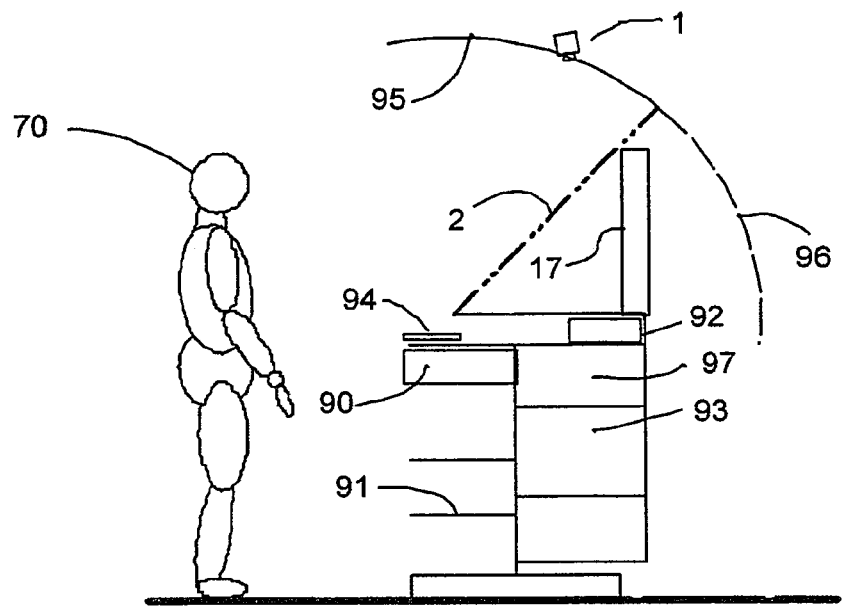
FIG. 50 illustrates an embodiment of the invention as a kiosk with the backdrop overhead.

FIG. 50 shows an embodiment of the invention integrated into a retail display or information kiosk. The two-way mirror 2 is angled to reflect a backdrop 95 above. The camera 1 is positioned along the line of sight of the image of a person displayed on the image display area 17. The backdrop 95 is reflected to appear as a superimposed image 96 behind the image display area 17. A keyboard 94 could be used to input information. Shelves 91 could be used for products. A dispensing device 97 could be used to dispense products. A payment device 90 could accept cash or credit card payments. A storage area 93 could be used to provide products for the dispensing device 97.

Figure 51:
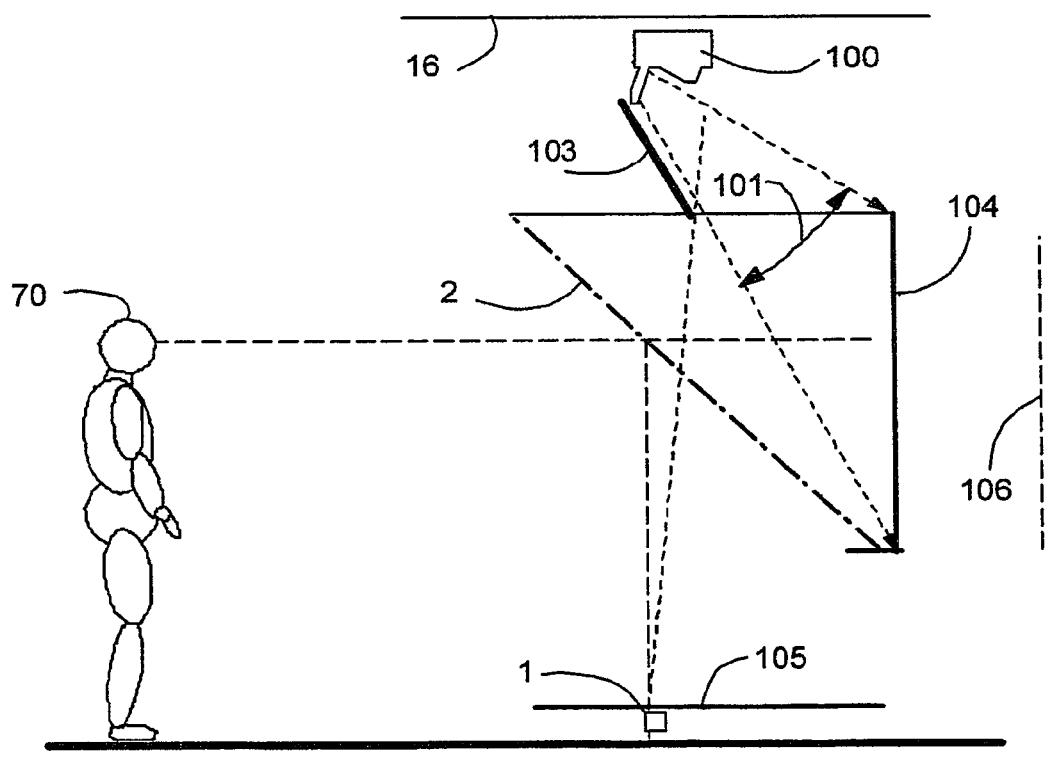
FIG. 51 illustrates a large scale embodiment of the invention with the backdrop at the level of the floor.

FIG. 51 shows a large embodiment of the invention. A standing observer 70 could view a life-size person appearing on a front projection screen 104. A projector 100 could be positioned above the two-way mirror 2 to project at an acute angle 101 toward the screen 104. A backdrop 105 could be positioned below the two-way mirror 2. The backdrop 105 would reflect in the two-way mirror 2 to appear to be a superimposed backdrop 106 on a second plane behind the image plane of the screen 104 on a first plane. A camera 1 could be incorporated into the backdrop 105. A black panel 16 could be positioned above the two-way mirror 2. A black light baffle 103 could be positioned between the camera 1 and the projector 100 so that the projector is not within the view of the camera 1.

Figure 52:
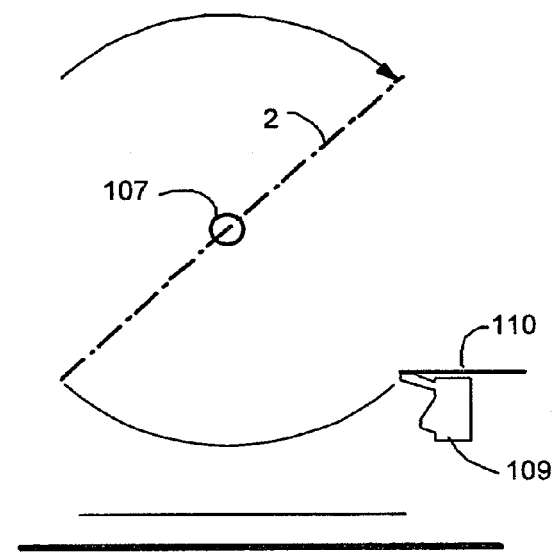
FIG. 52 illustrates the turning of the two-way mirror to the opposite direction.

FIG. 52 shows the configuration illustrated in FIG. 51 with the two-way mirror 2 rotated 90 degrees at a pivot point 107. A projector 109 is positioned below a table height panel 110. Further details regarding this configuration are provided with respect to FIG. 53.

Figure 53:
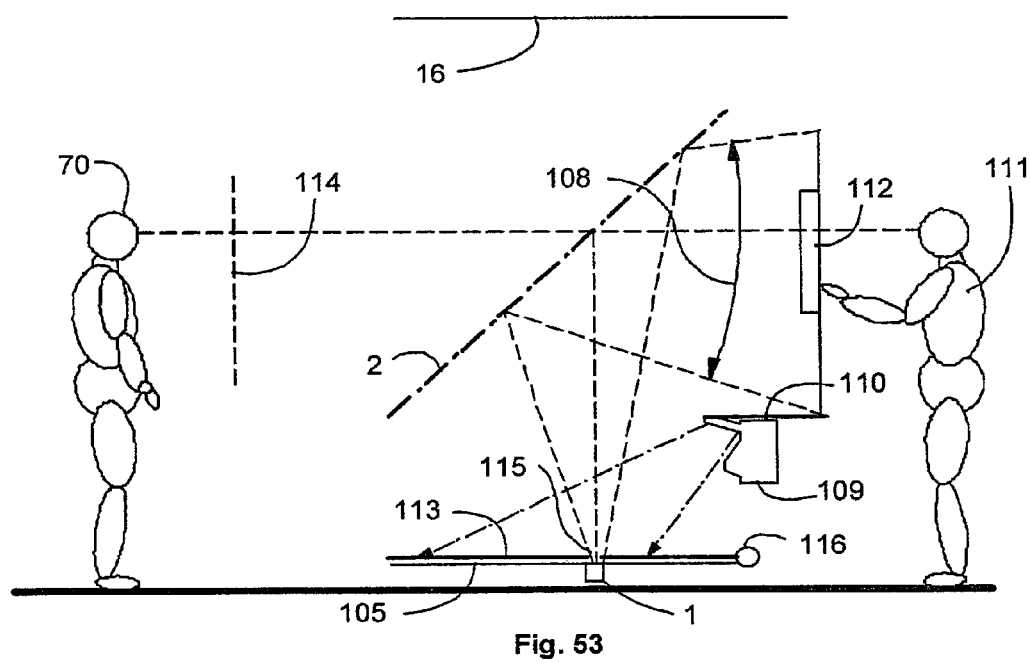
FIG. 53 illustrates the usage of the communications system for both transmission and for view of a remote audience and a real audience.

FIG. 53 shows a presenter 111 standing in a position within the view 108 of a camera 1. The camera 1 is located below the two-way mirror 2 with a small aperture 115 to view through a front projection screen 113. A black panel 16 is above the two-way mirror so that the camera view through the two-way mirror 2 does not add light to the camera image. The front projection screen 113 could be rolled out from a tube 116 to cover the backdrop 105. The camera 1 is positioned to be at eye level for the presenter 111 so that the presenter is captured at the correct angle for display at a distant location at a system as illustrated in FIG. 51. The presenter sees the reflection 114 of the image projected on the screen 113 by the projector 109 below the table height panel 110.

This configuration could allow a teacher to present to both a class in the same room and, simultaneously, present to a class in a distant location using a system as shown in FIG. 51. The teacher 111 would be able to make eye contact with a person 70 in the room when the room is illuminated bright enough for the teacher to clearly see the student in the room.

The lighting in the class room could be dimmed so that the teacher could clearly see the reflected image 114 of the remote classroom. The teacher could easily switch between discussions with the class present in the room or two-way interaction with the class in the distant location. The teacher would be directing his or her attention in the same direction for both locations so that all students would appear to be having the presentation directed toward them. The image of the teacher could be transmitted to an unlimited number of locations simultaneously. Any interaction with a selected location would appear directly in front of the teacher for natural interaction.

A flat panel monitor 112 could be positioned at a selected height by the presenter for making notations that would be displayed for the class. Since the teacher would be facing in the direction of the classes, he or she would not need to turn away from the class as would be done with a classic blackboard.

Figure 54:
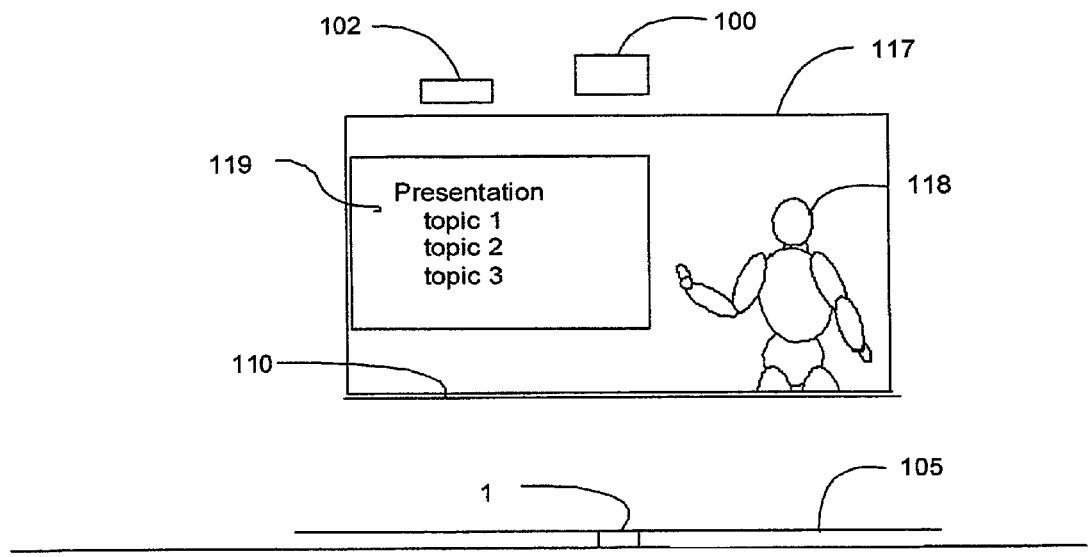
FIG. 54 illustrates a front view of FIG. 38 with a second screen for supporting visuals.

FIG. 54 shows a front view of the configuration of the large telepresence system illustrated in FIG. 51. The image area 117 is large enough for the presenter to move freely. A screen 119 shows graphics, such as a PowerPoint show or live annotations by the presenter. The image of the transmitted presenter 118 appears life-size above the level of a table 110. A projector 100 projects the image of the presenter 118. A second projector 102 projects the image of the graphic visual support 119. A backdrop 105 is reflected to appear behind the presenter 118 and the presentation screen 119.

Figure 55:
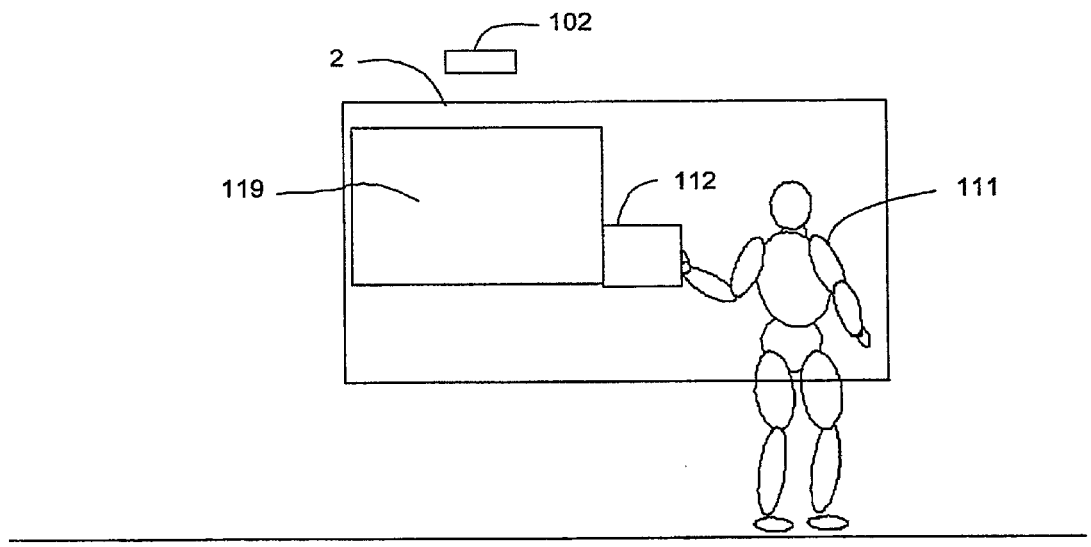
FIG. 55 illustrates an interactive panel for usage by the presenter.

FIG. 55 shows the front view of FIG. 53 with a portion of the image area 119 dedicated to a presentation, such as a PowerPoint show. This image could be projected by a second projector 102 so that the graphic image 119 would have the necessary brightness and high resolution. The image of the teacher needs to be in real time for interaction without any delay. In order to avoid excessive requirements for bandwidth; this real time image is compressed. However, a graphic display 119 does not have the same requirement for quick refreshing of the image. Therefore a high resolution image can be transmitted with a small bandwidth with a slower refresh rate. It may be more practical to have one transmission for the live presentation of the teacher and a second transmission for the graphic support. Furthermore, the graphic display could be contained on a computer at the location of the class with a data sharing software to allow the presenter 111 to send commands to trigger the advancing of the images.

A flat panel monitor 112 could be positioned at a comfortable height for the presenter 111 for making notations while standing in front of the class. The notations made by the presenter could appear on the screen 119 to the side. The presenter 111 can stand to the side or can walk into the area of the image of the projected image to provide annotations.

Figure 56:
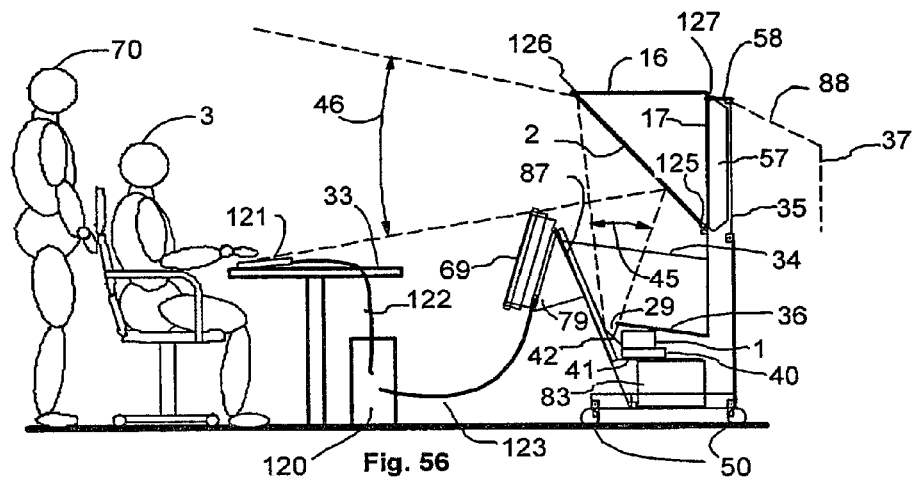
FIG. 56 illustrates a side section view of an embodiment of the invention with an image display device for presenting supporting visuals.

FIG. 56 shows a side section view of an embodiment of the invention that incorporates a second image display device 69, which could be an LCD monitor, plasma monitor or other type of image display device. The second image display device 69 is held in position with a mounting bracket 79. The second image display device 69 could be used for supporting visuals, such as PowerPoint presentations, computer graphics, financial data, drawings, illustrations and various other visuals. This configuration is designed so that the second image display device 69 and the mounting bracket 79 could be removed for usage of the communications system without the display of supporting visuals.

A camera 1 is positioned on top of a codec 40, which is used for coding and decoding video and audio transmission for the two-way communications. The codec 40 is placed on a horizontal shelf 41. The camera 1 is in a horizontal orientation viewing forward to a reflection off a mirror 42. The angle of view 45 off the mirror 42 is in an upward direction toward the two-way mirror 2. The view through the two-way mirror 2 is of the black out panel 16, which does not add any light to the camera image since it is substantially black. The reflection off the two-way mirror 2 is in a forward angle of view 46, which encompasses the observation zone including observers 3 and 70.

The two-way mirror 2 is held in position by a bracket 125 at the bottom edge and a bracket 126 at the top edge. The overhead panel 16 preferably acts as a structural tension member to hold the two-way mirror 2 at the desired angle. A set of hinges 127 holds the overhead panel 16 securely to the structure of the image display device enclosure 58. When the two-way mirror 2 is installed the overhead panel 16 could be rotated upward toward a vertical position while positioning the two-way mirror 2 on the supporting bracket 125. The hinges 127 preferably have a constant torque tension so that the overhead panel 16 would remain in an upward position while the two-way mirror 2 would be installed. Once the two-way mirror 2 is positioned on the lower supporting bracket 125 the overhead panel 16 could be lowered to allow a bracket 126 to overlap the top edge of the two-way mirror 2.

The observers 3 and 70 view through the two-way mirror 2 to see the image of a transmitted person appearing on the image display device 17. The two-way mirror 2 reflects a backdrop comprised of a back panel 36 and an angled front panel 87, which are viewed by the observer as the reflected back panel 37 and the reflected front angled panel 88. The top edges of the left and right side panels 34 are aligned to match the left and right back edges 35 of the image display enclosure 58.

The observers 3 and 70 will see the superimposed image of a transmitted person appearing on the screen of the image display device 17, which will be defined as a first plane being the closest to the observers. A second plane will be defined to be the location behind the first plane where the left and right back edges 35 of the image display device enclosure 58 match to the reflected image of the top edges 34 of the side panels of the backdrop. The third plane is defined as the more distant location behind the second plane where the back panel of the backdrop 36 is viewed as a reflection in the location of the dashed line 37. The top panel 87 of the backdrop extends from the second plane back to the third plane in the location of the dashed line 88.

A speaker 83 is located below the codec 40. The system is on casters 50 so that it can be easily moved within the room or between different locations. The seated observer 3 can input commands through a keyboard 121, which is connected to a computer 120 by way of a cable 122. The computer 102 is connected to the second image display device 69 by way of a cable 123. One skilled in the art will recognize that in other embodiments, the computer could be integrated within the housing of the telepresence display system.

Figure 57:
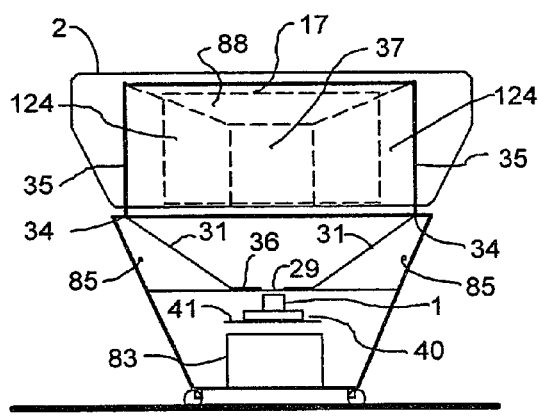
FIG. 57 illustrates a front section view of the embodiment in FIG. 56.

FIG. 57 shows a front section view of the embodiment of the invention shown in FIG. 56. A camera 1 is positioned above a codec 40, which is on a shelf 41. A speaker 83 is located below the shelf 41. Lights 85 are located in the enclosure behind the backdrop sides 31. The backdrop sides 31 are backlit display panels, which could be comprised of a white plastic light diffusion surface covered with a color transparency of a graphic or photographic image. The image on the color transparency could be of a composition that is optimal as the reflected backdrop sides 124 for the superimposed images of the transmitted person or people on the image display screen 17. The image on the transparency of the backdrop side 31 could incorporate a perspective view to accentuate depth or a texture to provide a depth cues. In particular, the transparency image could be of the optimal brightness to be bright enough to clearly view the reflected backdrop sides 124 in its relationship to the first plane of the image display device screen 17 incorporating the image of the transmitted person or people, however, not so bright that the superimposed image of the side backdrop panels 124 burn through the image of the first plane 17.

The back panel of the backdrop 36 incorporates an opening 29 for the view of the camera 1. The back panel of the backdrop 36 could be black so that it does not accentuate the opening 29, which is preferably dark or black in the area of the camera 1. When the back panel of the backdrop 36 is viewed as a reflection in the two-way mirror 2, it appears as a vertical panel 37 in the middle of the image area of the display screen 17. It is ideal for the reflected back backdrop panel 37 to be dark or black so that it does not superimpose any light onto the face or body of the transmitted person appearing in the middle of the screen 17. Likewise, it is preferable for the reflected front backdrop panel 88 to be dark so that it also does not superimpose light onto the face of the person appearing on the screen of the image display device 17. It is important to note that the sense of depth in the embodiment of this invention is achieved by the viewing of the telepresent person on the first plane relative to the backdrop appearing in the locations of the second and third plane that are further away. However, it is not necessary that the backdrop covers the full area of the first plane of the image display screen 17. In fact, it could appear more effective to see the telepresent person appearing to be extending out beyond the confines of the backdrop. This visual effect is achieved in this configuration in that the reflected side panels 124 do not cover the full area behind the image display screen 17. As a result, the head and extended arms of a telepresent person appearing on the image display screen 17 will extend above the reflected side panels 124 to accentuate the depth relationship.

Figure 58:
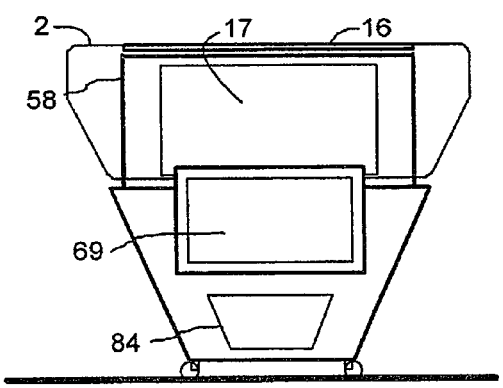
FIG. 58 illustrates a front elevation view of the embodiment in FIG. 56.

FIG. 58 shows a front elevation of the embodiment of the invention. The second display device 69 is in clear view in front of the image display device 17, which shows the telepresent person. The sound for the communications system emanates from the speaker aperture 84, which could be covered with a speaker grill. The two-way mirror 2 extends beyond the width of the image display device enclosure 58. The black overhead panel 16 is not obtrusive since it matches to the height of the two-way-mirror 2 and the image display enclosure 58.

Figure 59:
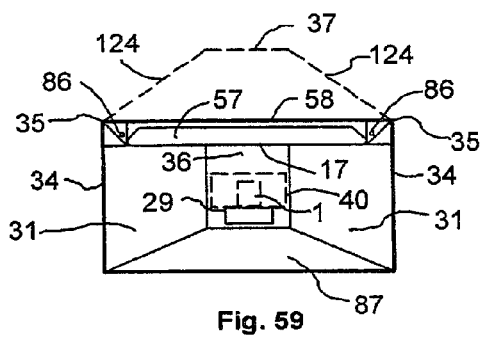
FIG. 59 illustrates a top section view of the embodiment in FIG. 56.

FIG. 59 shows a section in plan view of the embodiment of the invention. The camera 1 and codec 40 are below the back panel of the backdrop 36. An aperture 29 is the opening in the back of the backdrop 36. The front panel 87 extends to the back panel 36. The side panels 31 extend from the back panel 36 to the left and right edges 34. The width of the backdrop matches the width of the image display device enclosure 58 so that the left and right edges of the backdrop 34 match to the left and right edges of the enclosure 35. The image display device 57 shows an image on the first plane 17. A depth relationship is achieved by the physical depth relationship between a telepresent person appearing on the image display screen 17 at the first plane and the front edges of the reflected side backdrop panels 124 matching to the left and right edges 35 of the image display enclosure in the second plane. The reflected backdrop sides 124 extend from the edges of enclosure edges 35 in the second plane to the third plane of the reflected view of the reflected back backdrop panel 37.

Figure 60:
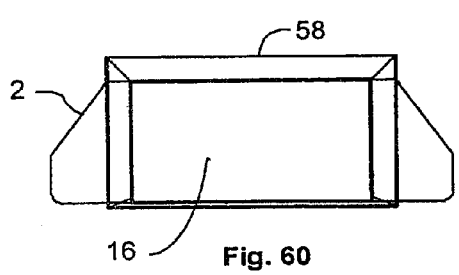
FIG. 60 illustrates a top elevation view of the embodiment in FIG. 56.

FIG. 60 shows a plan view of the embodiment of the invention with the black overhead panel 16 above the two-way mirror 2. The structure of the image display device enclosure 58 provides the support for holding the overhead panel 16 with the two-way mirror 2 supported at the front edge.

Figure 61:
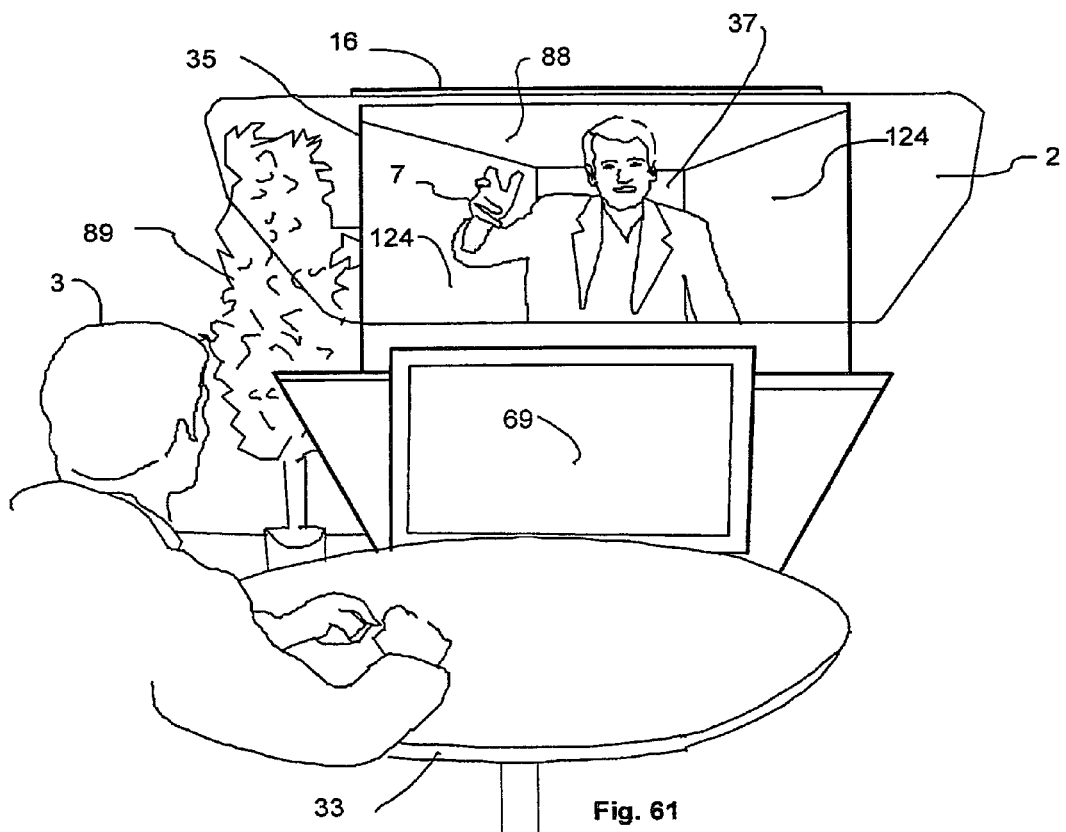
FIG. 61 illustrates a perspective view of the embodiment in FIG. 56.

FIG. 61 shows a perspective view of the embodiment of the invention with a telepresent person 7 appearing in front of the backdrop comprised of the reflected back panel 37, reflected sides panels 124 and reflected front panel 88. The depth relationship of the backdrop sides 124 to the background objects 89 is seen at the edge of the image display enclosure 35 as viewed through the two-way mirror 2. The second image display device 69 is in clear view of the observer 3 who are seated at a table 33.

Figure 62:
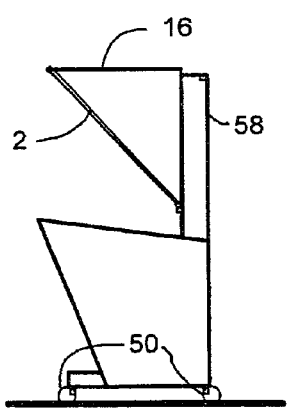
FIG. 62 illustrates a side elevation view of the embodiment in FIG. 56 without the second image display device.

FIG. 62 shows a side view of the embodiment of the invention without the second image display device. The communications system could be narrow enough to fit through a standard single door opening without requiring that the two-way-mirror 2, the overhead panel 16, or the image display enclosure 58 are removed. The communications system could be on casters 50 so that it would be easy to move the system between locations.

Figure 63:
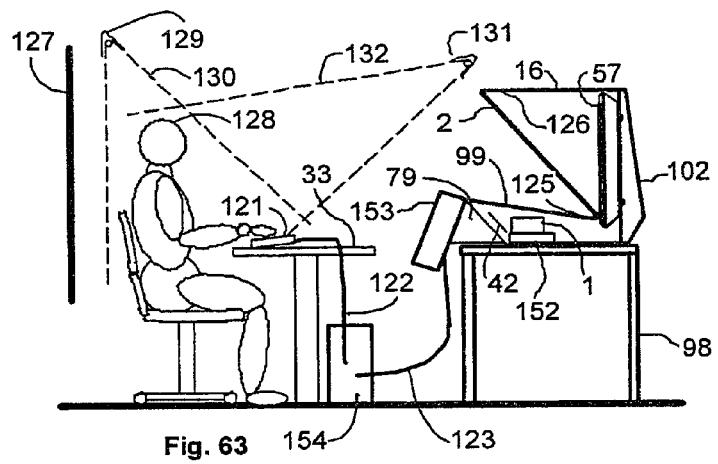
FIG. 63 illustrates a side section view of an embodiment of the invention that is positioned on a small table.

FIG. 63 shows another embodiment of the invention, which is configured for the transmission of a presenter 128 to a location with a system in an embodiment of the invention as previously described. In this embodiment the presenter 128 is positioned in front of a black surface 127 so that the captured image of the presenter 128 will be surrounded by black. When this image of the presenter 128 is displayed on a system with a reflected backdrop, the image of the presenter will appear as a bright and clear image while the rest of the surrounding black image area is not visible so that an illusion is created that the presenter is in the free space in front of the backdrop.

An advantageous application of this embodiment is for capturing the image of a presenter 128 to be transmitted to a location of an audience, classroom or group meeting. For this application, it is not necessary for the presenter to see the group at the remote location appearing in a depth relationship to a superimposed backdrop on a different image plane. The incoming image from a remote location of a group of people in a large room will not have the people appearing against a black background. When people are not appearing on a black background, a superimposed image of a backdrop would generate a conflicting image. Therefore, for this application, it is preferable to have a clear display of the incoming image without any superimposed backdrop. For these reasons, the two-way mirror 2 would reflect a backdrop 99, which could be black. The backdrop 99 is preferably the same width as the width of the image display device 57. Therefore, the presenter 128 will see a clear view of the image on the image display device 57 with no distracting reflection. To the outside of the left and right edges of the image display device 57 the presenter will see the background of the room setting.

The camera 1 could be positioned on top of a codec 152. The camera faces forward to view the reflection off a mirror 42 which in turn views the image reflected off the two-way mirror 2 to capture an image of the observation zone, including a presenter 128. The two-way mirror 2 is supported on a supporting bracket 125 and is held in position by the overhead panel 16, which has a bracket 126 overlapping the top edge of the two-way mirror 2. An image display device 57 could be supported by a structure 102.

A second image display device 153 could be held in position by a mounting bracket 79. The second image display device 153 could overlap the edge of the table 98 so that it is not so high that it would block the view of the image on the image display device 57. The presenter 128 is seated at a small table 33, which is positioned far enough away from the system located on the other table 98 so that the second image display device 153 could be within the gap between the tables and be within a clear view of the presenter 128. It could be helpful for the height of the table 33 to be adjustable so that the table does not block the view of the torso of the presenter 128.

The presenter 128 could use a computer interface device 121, such as a keyboard and mouse or a graphics tablet with a stylus that is connected by a cable 122 to a computer 120. The computer 154 could be connected to the second image display device 153 by a cable 123.

The quality of the image of the presenter 128 could be optimized for the best level of brightness, color temperature and balance by having strategically placed lights 129 and 131. The overhead light 129 could be positioned above the presenter 128 to illuminate a highlight on the top of the head and the shoulders. This highlight can be very effective in providing a clear edge to the head and shoulders of the presenter to stand out from the black background. This is especially important for capturing the image of a presenter with black or dark hair or for a presenter wearing a dark coat or shirt.

The overhead light 129 could have baffles or a method of focus to restrict the light to an angle of coverage 130 that illuminates the presenter 128 without illuminating the black background 127 or allowing light to shine onto the communications system. The front light 131 could have baffles or a method of focus to restrict the light to an angle of coverage 132 that would fall on the presenter without shining onto the second image display device 153 or other components of the communications system.

Figure 64:
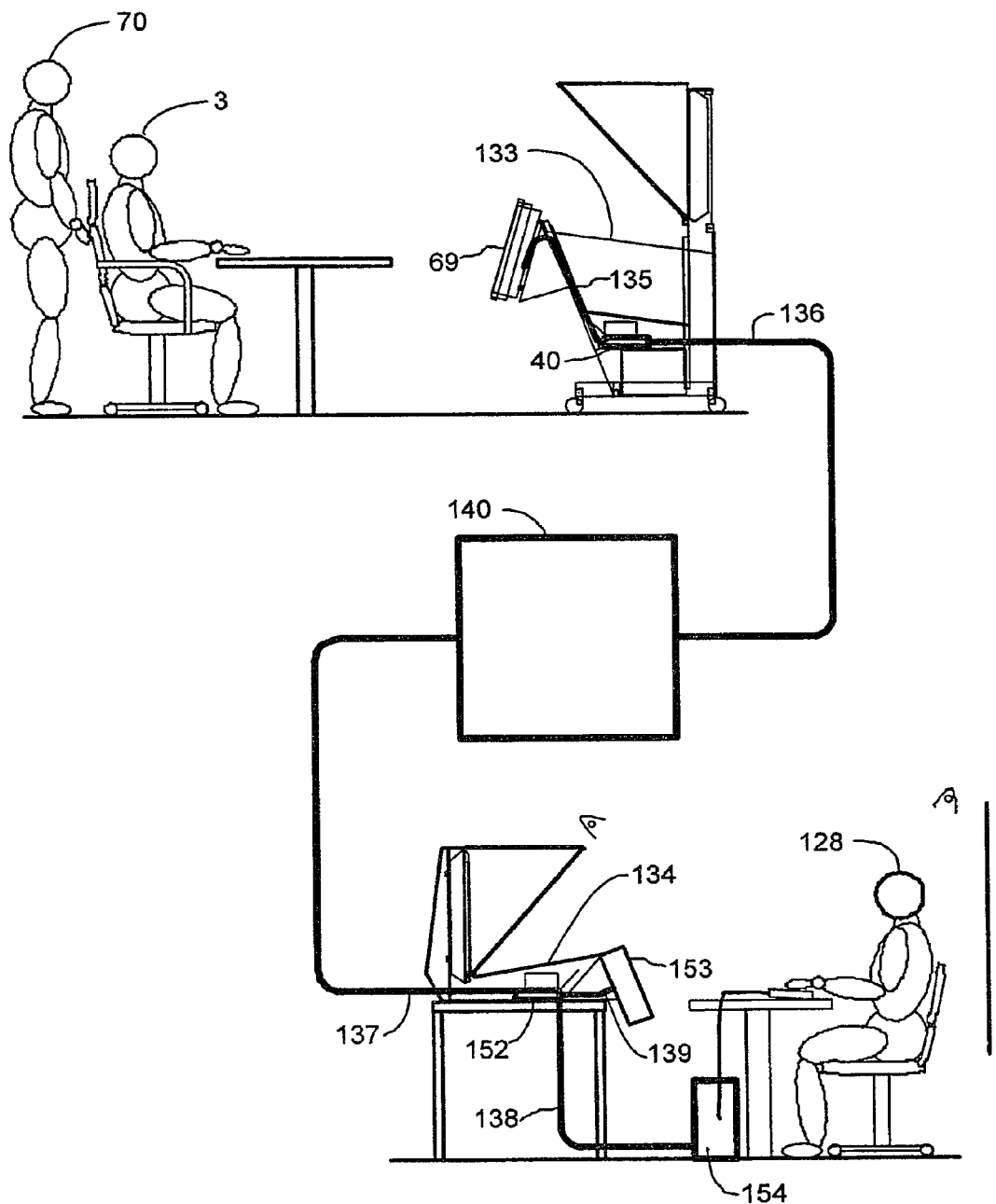
FIG. 64 illustrates a telepresence technologies network configuration with integrated data display.

FIG. 64 shows an embodiment of the invention in the configuration of a receiving communications system 133 connected by a network to a sending communications system 134. It should be noted that telepresence is not practical with standalone systems. Telepresence can be achieved when two or more systems are connected over a network that meets specific requirements. Therefore, it is advantageous for this invention to incorporate the specific technologies that are necessary to complete the telepresence communications. For the purposes of discussion, this embodiment of the invention is referred to as the "telepresence technologies configuration."

In this telepresence technologies configuration, the sending communications system 134 has a network connection 137 between the network 140 and the codec 152. The receiving communications system 133 has a network connection 136 between the codec 40 and the network 140. The network 140 could be an ISDN network, which could be provided by a telephone company. When transmitting on an ISDN network the codecs 40 and 152 will preferably code and decode the transmission of audio and video in the H.320 protocol.

Alternatively, the network could be an IP network, such as the Internet, Internet2, LAN, WAN, MAN, VPN, ATM, or other network for transmitting data in the Internet Protocol. When transmitting on an IP network the codecs 40 and 152 will code and decode the transmission of the audio and video in the H.323 protocol or another IP protocol.

The computer 154 at the location of the sending communications system 134 could be connected to the codec 152 with the cable 138 that would normally be connected to the display monitor 153. A cable 139 would be connected between the codec 152 and the display monitor 153 so that the signal is passed through to the display monitor 153. The codec 152 will have the capability of accepting the incoming signal for the display monitor through an internal hardware solution or an external data solutions box. The codec 152 will process the signal for the display monitor and transmit it as part of the output through the network connection 137.

The codec 40 for the receiving communications system 133 will receive the incoming signal over the network connection 136. The signal will be decoded by the codec 40 and transmitted to the display monitor over the cable 135. In this manner, the output of the computer 154 at the location of the sending communications system 134 will appear both at the display monitor 153 of the sending communications system 69 and at the display monitor 69 of the receiving communications system. The observers 3 and 70 in the receiving location will see the output of the computer 154 displayed in front of them on the image display device 69 as this visual content is controlled by the presenter 128 in the sending location.

It is not necessary for the receiving location to have a computer since the incoming visual presentation is received over the network 140 and decoded by the codec 40. However, in this configuration, the observers 70 and 3 do not have a means for interacting with the visual display content or an ability to transmit visual content back to the presenter 128.

Figure 65:
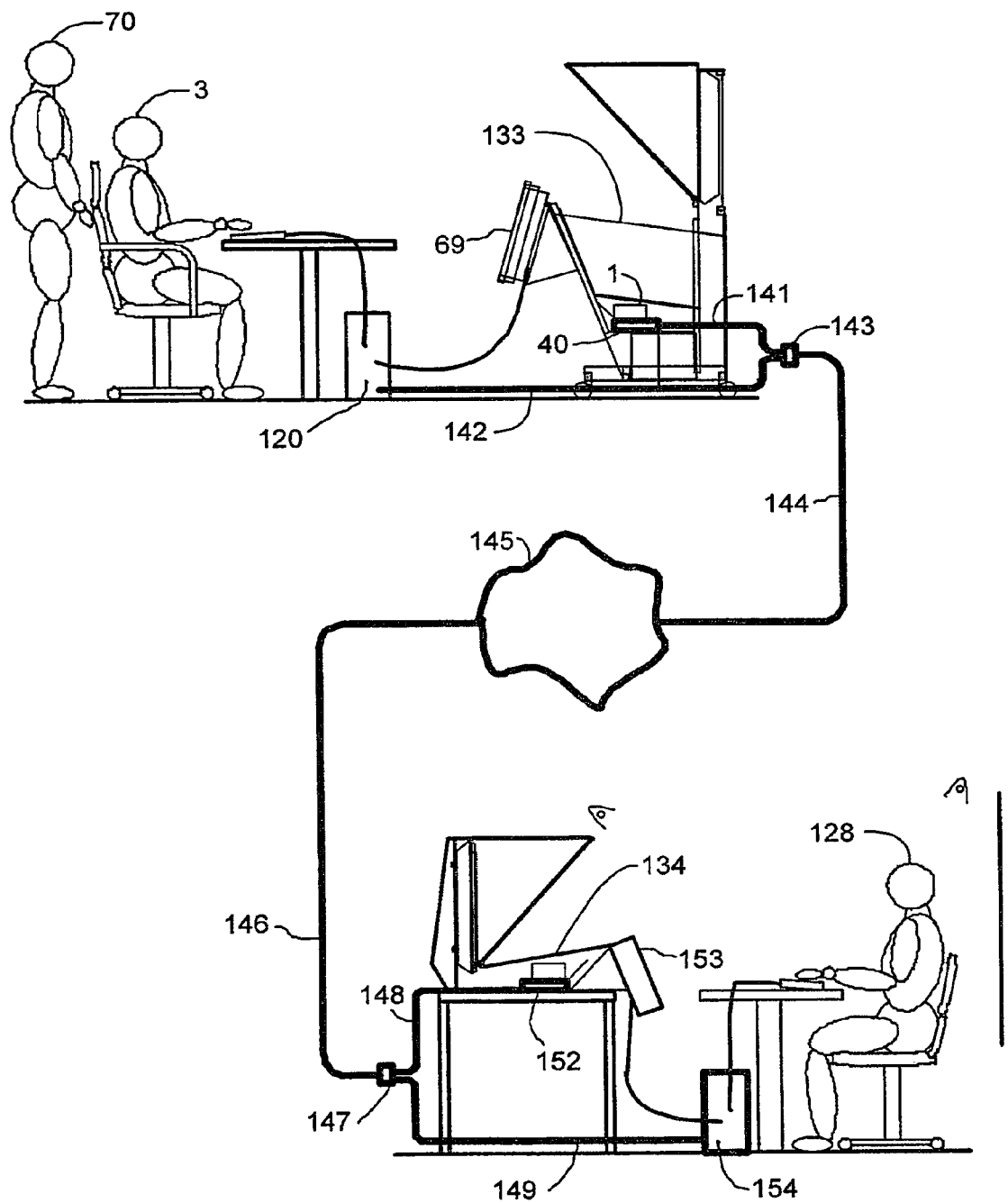
FIG. 65 illustrates a telepresence technologies network configuration with independent data sharing.

FIG. 65 shows a different telepresence technologies configuration with a sending communications system 134 connected over an IP network 145 to a receiving communications system 133. The IP network could be any network operating in the Internet Protocol, such as a LAN, WAN, MAN, VPN, Internet2, the Internet or other EP network. In this configuration, the codec 152 in the location of the sending communications system 134 is connected by a network cable 148, such as a CAT5 cable, to an input box 147 which is connected to an IP network 145 by a network connection 146, such as a T1 line, DSL, ADSL, VDSL, SDSL or other network delivery service. The codec 40 in the location of the receiving communications system 133 is connected to the network 145 by a cable 141 to a junction box 143 and a network service 144. The codecs 40 and 152 can establish two-way communication over the network 145.

The computer 154 at the location of the sending communications system 134 could have a network connection 149 to a junction box 147 for access over a network service 146 to a network 145. The computer 120 in the location of the receiving communications system 133 could have a network connection 142 to a junction box 143 to a network service 144 to a network 145. The two computers 120 and 154 can establish a connection over the network 145 and share data through a software application, such as Microsoft NetMeeting or another data sharing software. This configuration has the advantage that both the send and receive locations can interact with visual display material for effective collaboration. Also, this configuration has the advantage that the codecs 40 and 152 do not need to process any of the visual display material and, therefore, can dedicate their processing power and bandwidth to the quality of the audio and video transmission.

Figure 66:
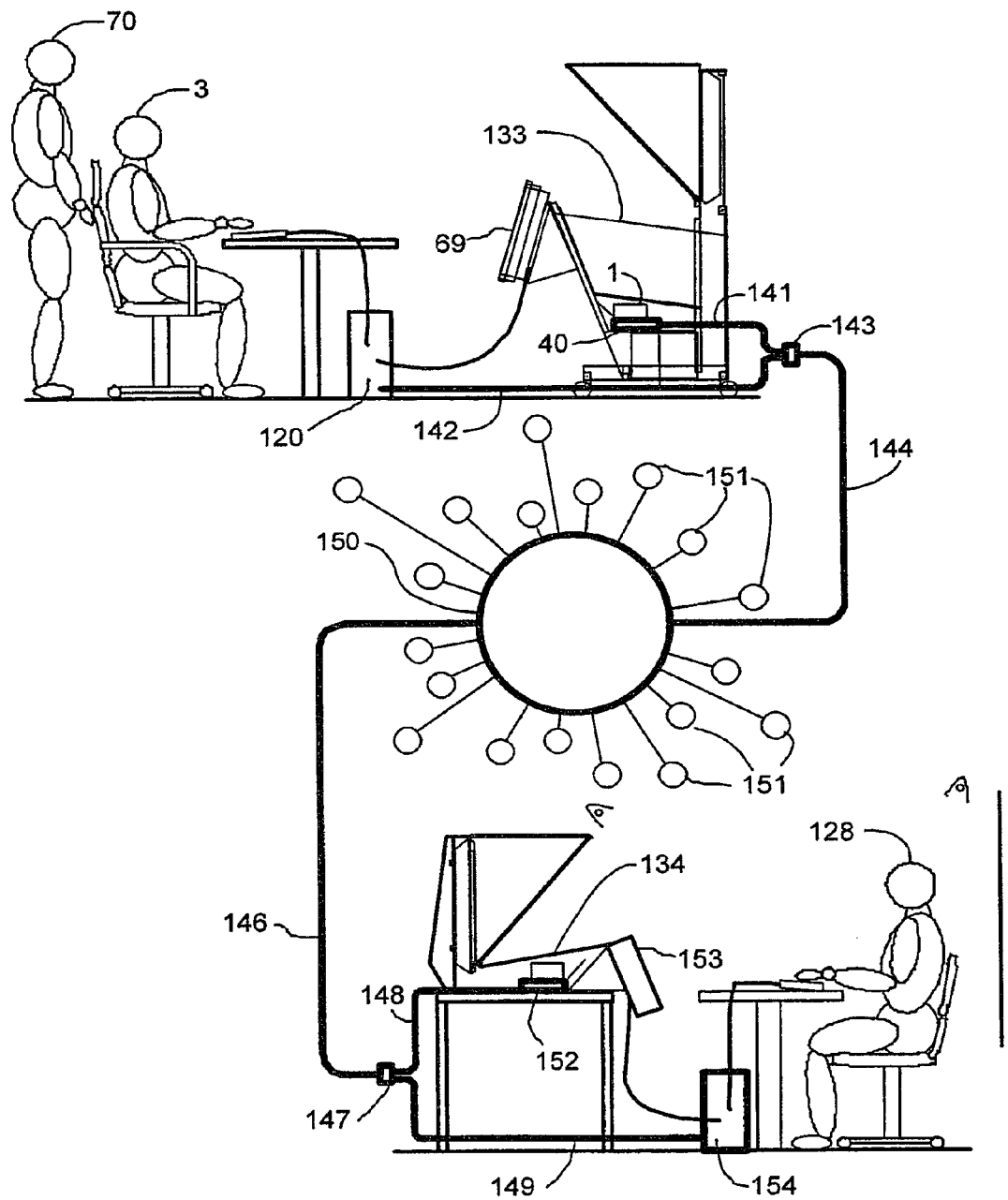
FIG. 66 illustrates a telepresence technologies architecture with a network connection to a central hub.

FIG. 66 shows a telepresence technologies architecture that embodies a custom network architecture and innovative equipment functionality. This telepresence technologies architecture has both the locations 133 and 134 connected to a telepresence operations center 150 that is specific to the requirements of achieving telepresence through the embodiment of the invention. Instead of a direct connection between the two locations 133 and 134, each location would establish a connection to the telepresence operations center. The telepresence operations center would be specific to receiving and transmitting life-size images of people with alignment for eye contact. Unlike typical network architecture using voice or data hubs, the telepresence technologies architecture would standardize the format of generating the three-dimensional qualities made possible through life-size communication with a reflected background. Furthermore, the telepresence technologies architecture would be engineered to synchronize the supporting visuals that would accompany the telepresence communications of life-size digital embodiments of people.

Through the telepresence technologies architecture, each telepresence location would have a permanent IP connection to the telepresence operations center. This IP connection could automatically revert to a low bandwidth when the telepresence system is not in use for communication. The codec in each location could be much less expensive and simpler than standard video conference codecs since there would not be any need for a directory or dialing capabilities. The codec could be hardwired to automatically connect to the telepresence operations center when the power to the codec is turned on. With the telepresence technologies architecture users would be able to access a directory at the telepresence operations center that would list the telepresence locations and provide a current status of whether or not they were in use or available for a new telepresence communication. Through the telepresence technologies architecture, all connections between telepresence users would be connected and managed through the telepresence operations center.

Numerous inventive applications and methods are also contemplated within the broad scope of the present invention. While not intended to be limiting or exhaustive, certain exemplary applications are discussed in the following paragraphs.

The telepresence technologies architecture described above can be adapted to allow telepresence users, for a fee, to enter virtual social venues managed by the telepresence operations center where they could meet people in chat rooms or prearranged meetings face-to-face for interaction with eye contact and natural human communication through facial expressions and body language to get to know people through telepresence for intellectual dialogue, dating, or intimate experiences. In another embodiment, users could, for a fee, take part in games, competitions, and entertainment that would involve the eye to eye contact with another person with a shared display of live computer graphics on the second image display device for participation from telepresence users connected from any location in the world to the telepresence operations center.

The telepresence technologies architecture described above may be configured to meet a global standards for telepresence and to have additional capabilities for specific applications in financial services where the transmission would be encrypted on a dedicated and secure network of a financial institution with a closely controlled telepresence operations center to deliver confidential financial information from banking centers to branch banks. This embodiment would preferably provide bank managers and financial specialists in the location of the financial centers to provide personal services face-to-face with key customers in remote locations with the sharing of critical financial information on the second image display device, along with additional equipment to print contracts and digitally scan and transmit signed contracts. The system preferably includes the equipment and systems to dispense money, cashier checks and other financial documents through the financial institutions telepresence operations center.

Another embodiment of the telepresence technologies architecture provides for telepresence communications systems to be used by medical technicians, physicians and practitioners at any location in the world to connect to the telepresence global network to reach the telepresence operations center where they can offer services to potential patients who would come to pharmacies and medical facilities where they could have an examination, medical test or refill of a prescription at an appointment with a certified physician through telepresence for a face-to-face evaluation. The physician could remotely operate specialist equipment to take blood pressure, cholesterol level, temperature, blood sugar level and other fundamental tests so that the physician could make new prescriptions or refill prescriptions and have the medicine automatically dispensed from the adjoining pharmacy to the patient upon payment through a credit card reader.

In another embodiment, the above described telepresence technologies architecture could be used by lecturers, professors, trainers and public speakers to transmit their presentations over a telepresence network connection to the telepresence operations center to have the presentation digitally recorded and stored as life-size appearances with synchronized visual support for playback to groups, audiences and classes that would view the telepresence presentation for a fee. The presenter could schedule through the telepresence operations center to appear at the end of the presentation to appear live for questions and answers, which would allow the presenter to maximize time and generate income from prerecorded presentations.

Yet another contemplated embodiment for the telepresence technologies architecture is telepresence communications systems produced to the global telepresence standard that could be installed in major business locations throughout the world so that people seeking a job or considering a change in employment could pay to use a room with a telepresence communications system that was connected over a telepresence network connection to the telepresence operations center. Appointments could be scheduled by employment agencies or through employment websites for interviews between applicants in one location and employers in another location with the potential for the applicant to take tests delivered through the telepresence operations center for display on the second image display device with networked services for immediate results and the potential for the applicant to a transmitted into the room for a face-to-face interview with the review board or hiring committee.

Still another contemplated embodiment includes the telepresence technologies architecture described above wherein the telepresence communications systems meeting the global telepresence standards can be installed in locations where security companies want to have the presence of guards, but recognize that the guards would not have an active role in security unless a security sensor was trigger. The system could display a digital recording of a security guard in the location for the majority of the time and would instantly switch to a live telepresence of a guard in the location if a security sensor was triggered so that the telepresent guard could see and evaluate the situation, have dialogue with people present and remotely activate alarms, lights and unlock or lock doors.

It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments. For instance, the above described embodiments could include a microphone adapted to receive sound from the observation zone and a speaker adapted to output sound to the observation zone. A communication device receiving video images from a camera and compressing said video images for an outgoing transmission on a network to a second communication system in a remote location and a communication device receiving an incoming transmission received over a network from said second communication system in said remote location and producing therefrom a video image to be displayed on said image display device is also contemplated.

Other variations include a communications system wherein the backdrop two-way mirror, and said light-absorbing panel fold into a supporting structure when not in use; or a communications system wherein said two-way mirror and said light-absorbing panel can be folded down to form a working desk with a direct view of said image display device. The communications may include a keyboard, mouse or other interactive device to allow control of the communications system and/or access interactive visual and audio material.

The communications system may be adapted for a business transaction and further comprise a kiosk incorporating said image display device, said two-way mirror, and said camera, said kiosk further comprising a credit card reader, a product dispensing device, and storage space for the promotion and distribution of products. Yet other variations and modifications will be apparent to one skilled in the art through routine experimentation and are considered and intended to be within the scope of the following claims.

What is claimed is:

1. A telepresence technologies configuration for allowing a user in a home location to see a substantially life-size image of a person from a remote location appearing in front of an apparent backdrop within a room setting and achieving an apparent eye contact while allowing for two-way interaction in real time for communication, the telepresence technologies configuration comprising:
   a first telepresence communications system to capture a video image and audio of the person in the remote location;
   a remote location codec to encode outgoing video image and audio signals and decode incoming video image and audio signals;
   a network connection to transmit two-way communications signals between said home location and said remote location;
   a home location codec to decode incoming video and audio signals from the remote location and code outgoing video image and audio signals for transmission to the remote location;
   a second telepresence communications system in the home location to display an image of the person from the remote location on a first image display device and project audio of the person from a speaker system; and
   at least one of the first telepresence communications system and the second telepresence communications system comprising:
      a second image display device having an image area substantially surrounded by an enclosure, the image area being positioned substantially within a vertical plane, the plane positioned for viewing by the user in an observation zone;
      a two-way mirror positioned between said observation zone and said second image display device and angled to reflect a backdrop;
      said backdrop being positioned adjacent said two-way mirror so that a reflection of a left edge and a right edge of said backdrop in said two-way mirror substantially aligns with a left and right edge, respectively of said enclosure when viewed from said observation zone;
      a camera located in said backdrop, such that said camera views said observation zone as a reflection off said two-way mirror; and
      a light-absorbing panel positioned above said two-way mirror opposite said camera and located in the view of said camera through said two-way mirror as said camera is aligned to view said reflection of said observation zone off said two-way mirror.

2. The telepresence technologies configuration of claim 1 wherein the second telepresence communications system includes a third image display device for the purpose of displaying supporting visual content to be shared between the home and the remote locations.

3. The telepresence technologies configuration of claim 1 wherein the video image and audio signals are coded and decoded by the remote location codec and the home location codec, respectively, and transmitted over the network connection and further including a data transmission enabled codec to transmit over the network connection, within the same bandwidth of the network connection, a computer screen image from one of the home location and the remote location to the other one of the home location and the remote location.

4. The telepresence technologies configuration of claim 1 wherein said network connection is dedicated to transmission of the video image and audio signals and further including a second network connection between a computer at the home location and a computer at the remote location for sharing of data and collaboration using a software application.

5. A telepresence technologies architecture for managing and facilitating telepresence communication for allowing a first user in a home location to see a substantially life-size image of a second user at remote location appearing in front of an apparent backdrop within a room setting and achieving an apparent eye contact while allowing for two-way interaction in real time for communication, the telepresence technologies architecture comprising:
   a first telepresence communications system to capture a video image and audio of said second user using a pre-determined telepresence standard that defines requirements for placement of a first camera relative a user, placement of said user relative a background, and appearance of said background;
   said first telepresence communications system in said remote location including a codec to encode outgoing video image and audio signals and to decode incoming video image and audio signals;
   a first network connection from the remote location to a telepresence operations center, the telepresence operations center including network connections to other remote locations;
   a second network connection from the home location to said telepresence operations center;
   a second codec in said home location to decode incoming video image and audio signals of said second user and to encode video image and audio signals of said first user for transmission to said remote location via said telepresence operations center;
   a second telepresence communications system in the home location, compatible with said pre-determined telepresence standard and configured to display, substantially life-size, said incoming images and audio signals of said second user in front of said apparent backdrop and within a three-dimensional setting of the home location; and
   at least one of the first telepresence communications system and the second telepresence communications system comprising:

an image display device having an image area substantially surrounded by an enclosure, the image area being positioned substantially within a vertical plane, the plane positioned for viewing by the user in an observation zone;

a two-way mirror positioned between said observation zone and said image display device and angled to reflect a backdrop;

said backdrop being positioned adjacent said two-way mirror so that a reflection of a left edge and a right edge of said backdrop in said two-way mirror substantially aligns with a left and right edge, respectively of said enclosure when viewed from said observation zone;

a second camera located in said backdrop, such that said camera views said observation zone as a reflection off said two-way mirror; and a light-absorbing panel positioned above said two-way mirror opposite said second camera and located in the view of said second camera through said two-way mirror as said second camera is aligned to view said reflection of said observation zone off said two-way mirror.

6. The telepresence technologies architecture of claim 5 wherein said codec and second codec are respectively restricted in capability to only connect to the telepresence operations center automatically when the telepresence communications system is powered up, and to remain connected as a constant connection to the telepresence operations center as long as the telepresence communications system is powered.

7. The telepresence technologies architecture of claim 5 wherein the first network connection includes a constant live connection between the telepresence operations center and the first telepresence communications system that operates at a low bandwidth when not in active use by a user and that delivers constant access to an on screen menu for access to a directory of other telepresence users with their current availability, scheduling services for arranging telepresence communication with others, features of services available from the telepresence operations center, and commercial telepresence services from telepresence service providers.

8. The telepresence technologies architecture of claim 5 wherein the telepresence operation center offers a service to users of recording incoming telepresence communications with a digital recording of incoming video image and audio signals and with a digital storing of supporting visuals in a standardized telepresence format to allow for the playback of the video image and audio signals on a first display device, with synchronized supporting visuals on a second image display device of the telepresence communications system.

9. The telepresence technologies architecture of claim 5 wherein the telepresence operations center delivers a service of the playback of digitally recorded telepresence sessions life-size appearance in a three-dimensional setting of the home location with synchronized visual support for display on said telepresence communications systems.

10. The telepresence technologies architecture of claim 5 further including a third network connection to third telepresence communications system employing the pre-determined protocol, and whereat an interpreter can provide translation services to said first and second users to facilitate communication therebetween.

11. The telepresence technologies configuration of claim 1, wherein the second telepresence communications system includes a fee charging mechanism to access a social network of a chat room or a face-to-face meeting with the person from the first telepresence communications system in the remote location.

12. The telepresence technologies configuration of claim 1, wherein the second telepresence communications system includes a fee charging mechanism to access a shared display of live video on a third image display device for participation from telepresence users in the second telepresence communications system in the home location.

13. The telepresence technologies configuration of claim 1, wherein the second telepresence communications system includes financial services equipment to perform at least one of print loan documents, scan signed documents, transmit scanned documents, dispense money, cash checks, print receipts, and perform branch banking functions from the first telepresence communications system in the remote location.

14. The telepresence technologies configuration of claim 1, wherein the second telepresence communications system includes medical diagnostic equipment to perform at least one of taking blood pressure, cholesterol level, body temperature, blood sugar level, and medical tests, and printing equipment to print prescriptions resulting from the person from the first telepresence communications system in the remote location, the person from the remote location being a physician or pharmacist.

15. The telepresence technologies configuration of claim 1, wherein the first telepresence communications system includes an educational system comprising an image capture device for capturing a video with a life-size appearance of the person from the remote location, a storage medium for storing the video, and synchronized visual equipment for playback of the video to an audience at the second telepresence communication system in the home location, the second telepresence communications system in the home location supporting a live lecture and a question and answer session.

16. The telepresence technologies configuration of claim 1, wherein the second telepresence communications system includes an interview room or booth for a job applicant to record a video to be made available to an employer, the second telepresence communications system supporting a live interview between the job applicant and the employer at the first telepresence communications system in the remote location.

17. The telepresence technologies configuration of claim 1, wherein the second telepresence communications system includes security system equipment to monitor an area of the communications system and transmit responses from at least one of motion detectors, video recognition devices, entrance sensors, and security badges to the first telepresence communications system in the remote location.

* * * * *